United States Patent
Wood et al.

(10) Patent No.: US 11,383,672 B2
(45) Date of Patent: Jul. 12, 2022

(54) ACTIVE PEDESTRIAN HOOD HINGE WITH INTEGRATED LATCH ASSEMBLY

(71) Applicant: Magna Closures, Inc., Newmarket (CA)

(72) Inventors: Thomas Wood, Midland (CA); Stefan Page, Wuppertal (DE); Stephan Holschbach, Wuppertal (DE)

(73) Assignee: MAGNA CLOSURES INC., Newmarket (CA)

( * ) Notice: Subject to any disclaimer, the term of this patent is extended or adjusted under 35 U.S.C. 154(b) by 133 days.

(21) Appl. No.: 16/697,547

(22) Filed: Nov. 27, 2019

(65) Prior Publication Data

US 2020/0164831 A1    May 28, 2020

Related U.S. Application Data

(60) Provisional application No. 62/779,166, filed on Dec. 13, 2018, provisional application No. 62/771,640, filed on Nov. 27, 2018.

(51) Int. Cl.
*B60R 21/38* (2011.01)
*B62D 25/12* (2006.01)
(Continued)

(52) U.S. Cl.
CPC ............. *B60R 21/38* (2013.01); *B62D 25/12* (2013.01); *E05D 7/1061* (2013.01); *E05D 3/06* (2013.01); *E05Y 2900/536* (2013.01)

(58) Field of Classification Search
CPC ............. B60R 21/38; B60R 2021/003; B60R 2021/0004; E05D 11/1007; E05D 11/1085;
(Continued)

(56) References Cited

U.S. PATENT DOCUMENTS 2,987,753 A * 6/1961 Krause ...................... E05D 3/06
                                                                    16/288
3,815,176 A * 6/1974 Porter ..................... E05D 3/145
                                                                    16/288
(Continued)

FOREIGN PATENT DOCUMENTS

CN          1672988 A      9/2005
CN        101746345 A      6/2010
(Continued)

OTHER PUBLICATIONS

International Search Report and Written Opinion of the International Searching Authority dated Jun. 10, 2020 from International Application No. PCT/CA2020/050476.

*Primary Examiner* — Paul N Dickson
*Assistant Examiner* — Timothy Wilhelm
(74) *Attorney, Agent, or Firm* — Dickinson Wright PLLC

(57) ABSTRACT

An active hinge including a hood bracket for attachment to a vehicle hood and a body bracket for attachment to a vehicle body. A deploy bracket is pivotally attached to the hood bracket and the body bracket. The hood bracket is pivotable relative to the deploy bracket between a non-deployed position and a deployed position. At least one link interconnects, and is pivotally connected to the deploy bracket and the body bracket. A pawl is pivotally mounted to one of the hood bracket, the body bracket, the deploy bracket, and the at least one link. A bolt for engagement by the pawl is connected to another of the hood bracket, the body bracket, the deploy bracket, and the at least one link. An actuator is provided for disengaging the pawl from the bolt to allow the deploy bracket to move relative to the hood bracket and the body bracket.

18 Claims, 22 Drawing Sheets

(51) Int. Cl.
*E05D 7/10* (2006.01)
*E05D 3/06* (2006.01)

(58) Field of Classification Search
CPC . E05D 3/145; E05D 2011/009; E05D 7/1061; E05D 3/06; E05Y 2201/22; E05Y 2900/536; B62D 25/105
See application file for complete search history.

(56) References Cited

U.S. PATENT DOCUMENTS

| | | | | |
|---|---|---|---|---|
| 4,727,621 A * | 3/1988 | Emery | E05D 3/125 | 16/239 |
| 6,415,882 B1 * | 7/2002 | Schuster | B60R 21/38 | 16/223 |
| 6,513,617 B2 * | 2/2003 | Sasaki | B60R 21/38 | 16/222 |
| 6,554,093 B2 * | 4/2003 | Sasaki | B60R 21/38 | 16/371 |
| 6,618,904 B1 * | 9/2003 | Nagy | E05D 3/145 | 16/288 |
| 6,934,999 B2 * | 8/2005 | Kreth | B60R 21/34 | 16/222 |
| 6,942,056 B2 * | 9/2005 | Nadeau | B60R 21/38 | 180/274 |
| 6,953,220 B2 * | 10/2005 | Takehara | B62D 25/105 | 180/69.2 |
| 7,073,846 B2 * | 7/2006 | Borg | B60R 21/38 | 180/274 |
| 7,080,428 B2 * | 7/2006 | Hyde | E05D 7/1061 | 16/231 |
| 7,093,877 B2 * | 8/2006 | Duffy | E05D 3/16 | 296/76 |
| 7,303,040 B2 * | 12/2007 | Green | B60R 21/38 | 180/274 |
| 7,475,752 B2 * | 1/2009 | Borg | B60R 21/38 | 180/274 |
| 7,552,789 B2 * | 6/2009 | Gust | B60R 21/38 | 180/69.21 |
| 7,575,273 B2 * | 8/2009 | Wallman | B60R 21/38 | 180/274 |
| 7,594,555 B2 * | 9/2009 | Lutter | B60R 21/38 | 180/69.21 |
| 7,597,166 B2 * | 10/2009 | Parks | B60R 21/38 | 180/274 |
| 7,637,344 B2 * | 12/2009 | Park | B60R 21/38 | 180/274 |
| 7,690,465 B2 * | 4/2010 | Hirata | B60R 21/34 | 180/69.21 |
| 7,712,569 B2 * | 5/2010 | Scheuch | B60R 21/38 | 180/274 |
| 7,766,411 B2 * | 8/2010 | Wegener | B60J 7/202 | 296/107.08 |
| 7,815,007 B2 * | 10/2010 | Mori | B60R 21/38 | 180/274 |
| 7,845,053 B2 * | 12/2010 | Marsh | E05D 11/06 | 16/357 |
| 7,845,715 B2 * | 12/2010 | Lim | E05D 5/0207 | 296/193.11 |
| 7,896,122 B2 * | 3/2011 | Borg | B62D 25/12 | 180/274 |
| 7,934,293 B2 * | 5/2011 | Kalargeros | B60R 21/38 | 16/369 |
| 7,946,376 B2 * | 5/2011 | Hayashi | B60R 21/38 | 180/274 |
| 7,954,588 B2 * | 6/2011 | Inomata | B60R 21/38 | 180/274 |
| 8,069,943 B2 * | 12/2011 | Takahashi | B60R 21/38 | 180/274 |
| 8,141,671 B2 * | 3/2012 | Aoki | B62D 25/12 | 180/69.21 |
| 8,201,306 B2 * | 6/2012 | Kim | E05F 1/1215 | 16/360 |
| 8,307,935 B2 * | 11/2012 | Takahashi | B62D 25/12 | 180/274 |
| 8,311,701 B2 * | 11/2012 | Iwai | B60R 21/38 | 701/36 |
| 8,387,214 B2 * | 3/2013 | Jung | E05F 15/47 | 16/354 |
| 8,398,125 B2 * | 3/2013 | Takahashi | B60R 21/34 | 292/45 |
| 8,419,106 B2 * | 4/2013 | Baba | E05D 11/1007 | 296/107.08 |
| 8,484,804 B2 * | 7/2013 | Mehta | B60R 21/38 | 16/370 |
| 8,528,959 B2 * | 9/2013 | Baba | B60K 15/05 | 296/97.22 |
| 8,534,410 B2 * | 9/2013 | Nakaura | B60R 21/38 | 180/274 |
| 8,544,590 B2 * | 10/2013 | McIntyre | B60R 21/38 | 180/274 |
| 8,768,574 B1 * | 7/2014 | Shaw | B60R 21/38 | 701/45 |
| 8,893,354 B2 * | 11/2014 | McIntyre, I | B60R 21/38 | 16/343 |
| 8,939,249 B2 * | 1/2015 | Kuhr | B60R 21/38 | 180/274 |
| 9,085,282 B2 * | 7/2015 | Agell Merino | B60R 21/38 | |
| 9,121,212 B2 * | 9/2015 | Carothers | E05D 3/125 | |
| 9,283,925 B2 * | 3/2016 | Mardi | B60R 21/38 | |
| 9,327,677 B2 * | 5/2016 | Fermer | B60R 21/36 | |
| 9,340,179 B2 | 5/2016 | Kim et al. | | |
| 9,366,066 B2 | 6/2016 | Hwang | | |
| 9,475,452 B2 * | 10/2016 | Lindmark | B62D 25/12 | |
| 9,481,340 B2 * | 11/2016 | Kim | B60R 21/38 | |
| 9,551,175 B2 * | 1/2017 | Labbe | E05D 11/00 | |
| 9,566,939 B1 * | 2/2017 | Rivera | B60R 21/38 | |
| 9,637,082 B2 | 5/2017 | Ferri et al. | | |
| 9,701,277 B2 * | 7/2017 | McIntyre | B60R 21/38 | |
| 9,708,010 B2 * | 7/2017 | Inoue | B60R 21/38 | |
| 9,764,711 B2 * | 9/2017 | Narita | E05D 7/086 | |
| 9,783,154 B2 * | 10/2017 | Kim | E05D 5/0207 | |
| 9,821,755 B2 * | 11/2017 | Farooq | B60R 21/38 | |
| 9,970,223 B2 * | 5/2018 | Hall | E05D 3/145 | |
| 10,100,565 B2 * | 10/2018 | Waskie | E05F 3/20 | |
| 10,118,587 B2 * | 11/2018 | Czechtizky | E05D 3/06 | |
| 10,315,612 B2 * | 6/2019 | Yamada | B60R 21/38 | |
| 10,315,613 B2 * | 6/2019 | Patterson | E05D 11/10 | |
| 10,434,974 B2 * | 10/2019 | Henck | E05B 77/08 | |
| 10,752,201 B2 * | 8/2020 | Fredriksson | B60R 21/38 | |
| 2005/0257980 A1 * | 11/2005 | Green | B62D 25/12 | 180/274 |
| 2006/0102402 A1 * | 5/2006 | Birk | E05D 11/00 | 180/89.17 |
| 2007/0075554 A1 * | 4/2007 | Gavriles | E05F 1/1091 | 292/339 |
| 2007/0151791 A1 * | 7/2007 | Gust | B60R 21/38 | 180/274 |
| 2008/0034552 A1 * | 2/2008 | Nguyen | E05D 3/145 | 16/375 |
| 2008/0189015 A1 * | 8/2008 | Borg | B60R 21/38 | 701/45 |
| 2009/0223360 A1 * | 9/2009 | Aoki | B60R 21/38 | 92/15 |
| 2009/0288271 A1 * | 11/2009 | Kmieciak | B60R 21/38 | 16/308 |
| 2009/0289473 A1 * | 11/2009 | Kmieciak | E05D 11/1014 | 296/193.11 |
| 2010/0024162 A1 * | 2/2010 | Walz | B60R 21/38 | 16/233 |
| 2013/0227818 A1 * | 9/2013 | Zippert | B60R 21/38 | 16/366 |
| 2014/0182962 A1 * | 7/2014 | McIntyre, I | B60R 21/38 | 180/274 |
| 2015/0048651 A1 * | 2/2015 | Schabenberger | B60R 21/38 | 296/187.04 |
| 2017/0036643 A1 * | 2/2017 | Matsushima | B62D 25/10 | |
| 2017/0057458 A1 * | 3/2017 | Narita | B60R 21/38 | |
| 2017/0231797 A1 * | 8/2017 | LeCursi | A61F 5/0127 | 602/16 |

(56) References Cited

U.S. PATENT DOCUMENTS

| | | | | |
|---|---|---|---|---|
| 2017/0259776 A1* | 9/2017 | Mclundie | ................ | B60R 21/38 |
| 2017/0282847 A1* | 10/2017 | Jenny | ...................... | B60R 21/38 |
| 2017/0369028 A1* | 12/2017 | Patterson | .................. | E05D 3/06 |
| 2018/0079385 A1* | 3/2018 | Henck | ...................... | E05B 77/08 |
| 2020/0164831 A1* | 5/2020 | Wood | ................... | E05D 7/1061 |
| 2020/0165851 A1* | 5/2020 | Page | ....................... | E05D 3/145 |

FOREIGN PATENT DOCUMENTS

| | | |
|---|---|---|
| CN | 201777305 U | 3/2011 |
| JP | 2008120117 A | 5/2008 |
| JP | 4968482 B2 | 7/2012 |
| KR | 101609065 B1 | 4/2016 |
| KR | 101610945 B1 | 4/2016 |
| KR | 101610946 B1 | 4/2016 |
| KR | 101610948 B1 | 4/2016 |
| KR | 101619666 B1 | 5/2016 |
| WO | 2017206987 A1 | 12/2017 |

\* cited by examiner

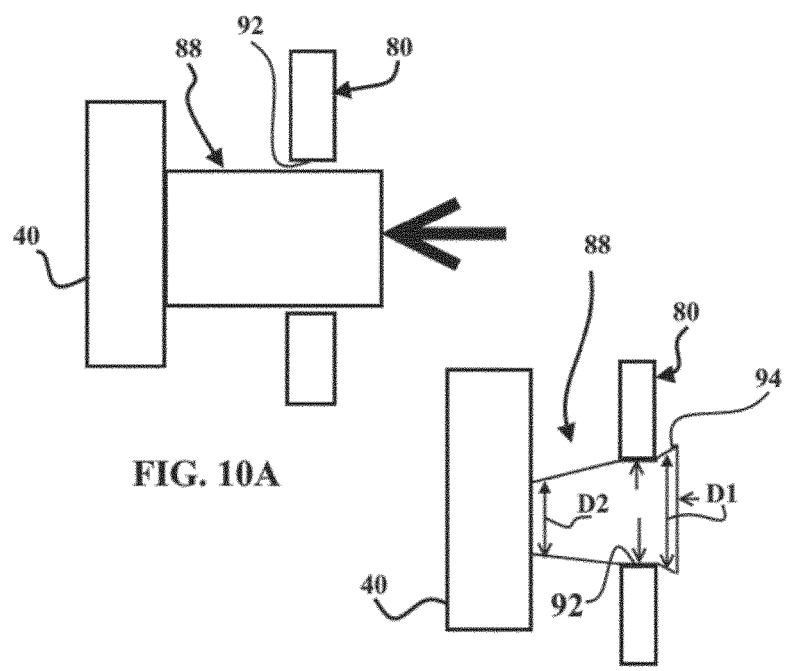
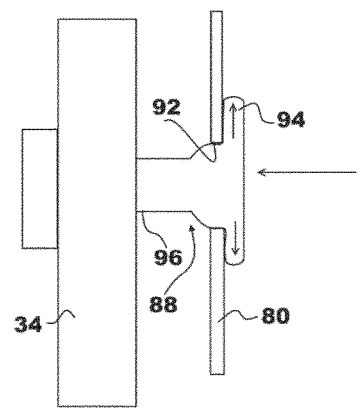
FIG. 10A
FIG. 10B
FIG. 10C

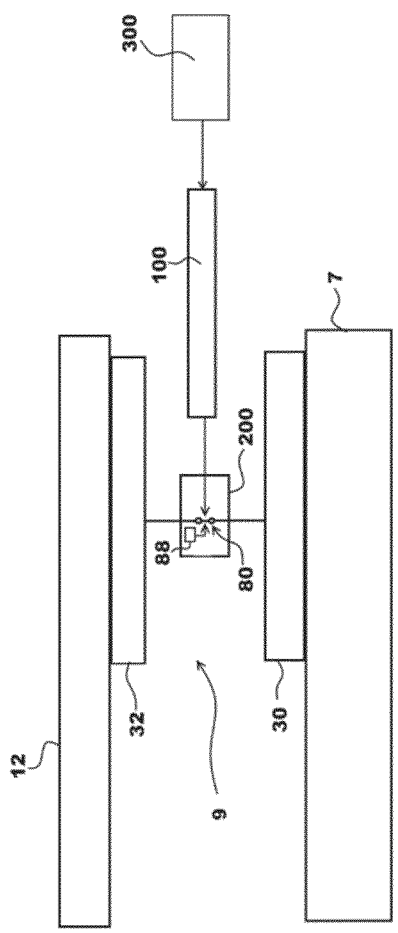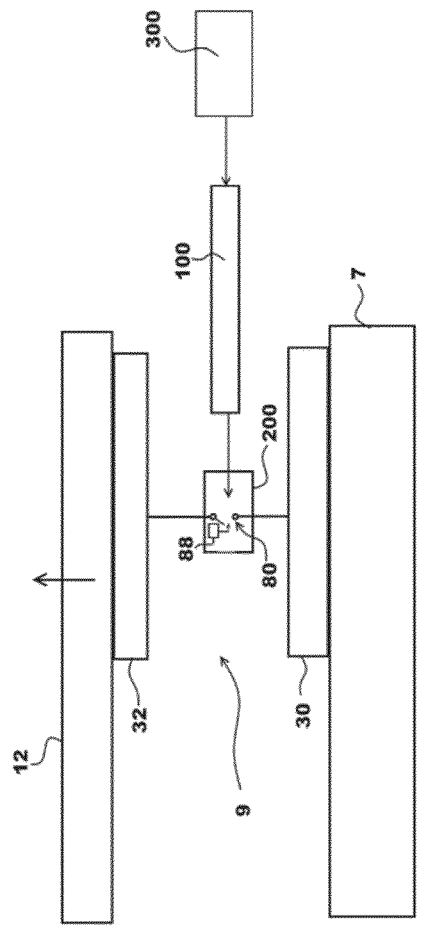

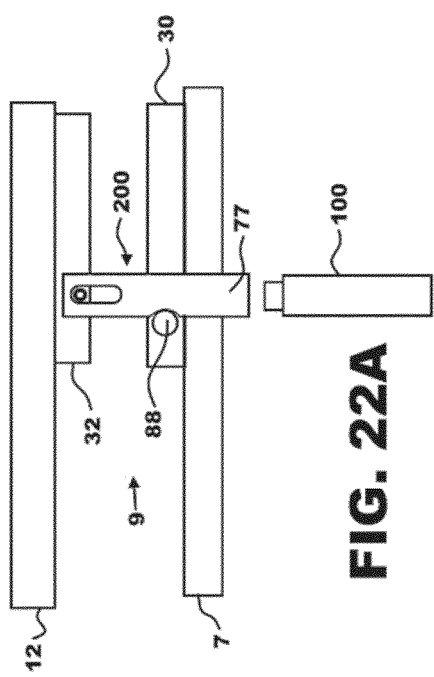
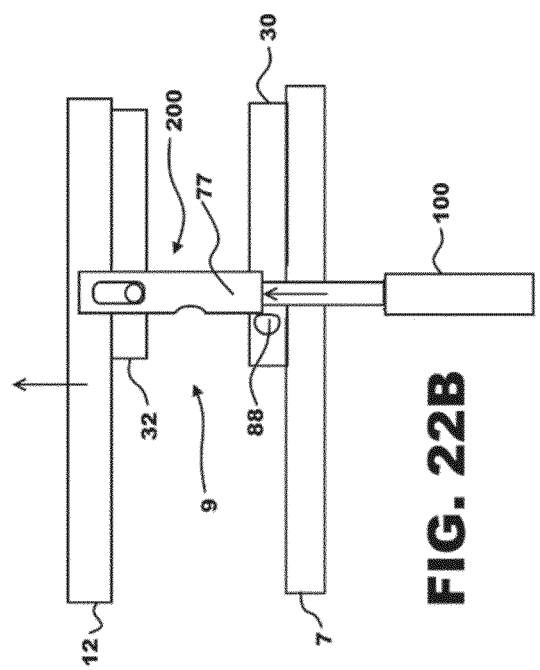

ACTIVE PEDESTRIAN HOOD HINGE WITH INTEGRATED LATCH ASSEMBLY

CROSS REFERENCE TO RELATED APPLICATIONS

This application claims the benefit of U.S. Provisional Application Ser. No. 62/771,640 filed Nov. 27, 2018 and U.S. Provisional Patent Application Ser. No. 62/779,166 filed Dec. 13, 2018. The entire disclosure of the above applications are incorporated herein by reference.

FIELD OF THE INVENTION

The present disclosure relates generally to pedestrian protection systems for motor vehicles of the type having a deployable hood assembly equipped with active hinges. More particularly, the present disclosure is directed to an active hinge for use with a deployable hood assembly and which has a pawl and bolt engaged by the pawl for maintaining the active hinge in a deployed position until an actuator releases the pawl from the bolt.

BACKGROUND OF THE INVENTION

This section provides background information related to the present disclosure which is not necessarily prior art.

In recent years, a great deal of emphasis has been directed to development of pedestrian protection systems for use in motor vehicles in an effort to reduce the likelihood or severity of injuries caused during a collision between a pedestrian and a motor vehicle. One such area of development has been directed to equipping the motor vehicle with a hood assembly capable of absorbing impact forces.

A "passive" pedestrian protection system associated with the hood assembly includes providing a pocket of under-hood crush space between the hood and the components within the vehicle's engine compartment. This crush space is configured to reduce the chance of bodily impact with the components within the engine component and, more particularly, to provide an impact absorbing feature. However, the use of low profile hoods in modern motor vehicles for improved aesthetics and aerodynamics, in combination with smaller engine compartments, limits the available crush space.

As an alternative, an "active" pedestrian protection system associated with the vehicle's hood assembly provides a "deployable" hood that is configured to raise a rear portion of the latched hood to create the additional under-hood crush space. This deployable hood feature is activated in response to detection of a pedestrian collision with the front end of the motor vehicle. Typically, a pair of active hinges are incorporated into the hood assembly. Each active hinge includes a pivot linkage interconnecting the hood to the vehicle body and an actuator that is operable to forcibly move the pivot linkage for causing the hood to move from a non-deployed position to a deployed position in response to detection of the pedestrian impact. Examples of active hinges that provide this functionality are disclosed in commonly-owned U.S. Pat. No. 8,544,590 and U.S. Publication No. 2014/0182962.

There remains a need for further improvements to such active hinges.

SUMMARY OF THE INVENTION

This section provides a general summary of the disclosure and is not intended to be interpreted as a comprehensive listing of its full scope or of all of its objects, aspects, features and/or advantages.

It is an aspect of the present disclosure to provide an active hinge that is simple in design, uses few components, and is inexpensive to manufacture and incorporate into vehicles.

It is another aspect of the present disclosure to provide an active hinge that requires a small stroke of an actuator to rotate a pawl from a locked position to an unlocked position to allow at least two of a body bracket, a hood bracket and a deploy bracket to rotate relative to one another.

It is another aspect of the present disclosure to provide a pawl design that is easy to manufacture and does not require fine blanking of components.

In accordance with these and other aspects of the present disclosure, an active hinge is provided. The active hinge includes a hood bracket for attachment to a vehicle hood, a body bracket for attachment to a vehicle body, and a deploy bracket pivotally attached to the hood bracket and the body bracket. The hood bracket is pivotable relative to the deploy bracket between a non-deployed position and a deployed position. At least one link interconnects and is pivotally connected to the deploy bracket and the body bracket. A pawl is pivotally mounted to one of the hood bracket, the body bracket, the deploy bracket, and the at least one link. The pawl is configured to engage a bolt. The bolt is connected to another of the hood bracket, the body bracket, the deploy bracket, and the at least one link. An actuator is configured to selectively pivot the pawl for disengaging the pawl from the bolt to allow at least one of the hood bracket, the body bracket and the at least one link to move relative to another of the at least one of the hood bracket, the body bracket and the at least one link to allow the hood bracket to move from a non-deployed position to a deployed position.

The arrangement of the subject active hinge requires little energy to activate the actuator and rotate the pawl to allow the hood bracket to move to the deployed position. More particularly, the subject active hinge requires less energy than prior art active hinge systems which typically require locking devices to be destroyed by an actuator in order to provide movement of a deploy bracket. Furthermore, the position of the pawl next to the actuator of the subject active hinge requires a small actuator stroke to provide rotation of the pawl to allow the hood bracket to move into the deployed position.

According to another aspect of the disclosure, the pawl defines a hook portion that defines a pocket that receives the bolt, and the bolt tapers radially outwardly for fixing the pawl to the bolt to hold at least two of the hood bracket, the body bracket and the deploy bracket together. Accordingly, the active hinge does not require a spring to hold the pawl in a locked position, and the pawl holds the components of the active hinge in tension, thus preventing noise, vibrations and rattling.

A method for assembling an active hinge is also provided. The method includes providing a hood bracket for attachment to a vehicle hood and providing a body bracket for attachment to a vehicle body. The method also includes pivotally connecting a deploy bracket to the hood bracket and pivotally connecting the deploy bracket to the body bracket. The method also includes pivotally connecting a link to the deploy bracket and pivotally connecting the link to the body bracket. The method also includes pivotally connecting a pawl to one of the hood bracket, the body bracket, the deploy bracket, and the at least one link, wherein the pawl defines a pocket. The method also includes positioning a bolt against one of the hood bracket, the body bracket, the deploy bracket, and the at least one link, with the bolt received by the pocket of the pawl. The method also includes applying an axial compressive force to the bolt to radially expand the safety bolt and eliminate radial gaps between the safety bolt and the pawl to inhibit movement between the at least one of the hood bracket, the body bracket, the deploy bracket and the at least one link which the pawl is connected to and the at least one of the hood bracket, the body bracket, the deploy bracket and the at least one link which the bolt is positioned against.

Compressing/shaping the bolt in this manner eliminates the need for a spring to hold the pawl in a locked position, and the pawl holds the components of the active hinge in tension, thus preventing noise, vibrations and rattling.

An active hinge is also provided, the active hinge including a hood bracket for attachment to a vehicle hood, a body bracket for attachment to a vehicle body, a locking mechanism coupled between the hood bracket and the body bracket, the locking mechanism comprising an unlocked state for allowing the hood bracket to move away from the body bracket and a locked state for preventing the hood bracket to move away from the body bracket, the locking mechanism further comprising a bolt in a tensed relationship with the locking mechanism for maintaining the locking mechanism in the locked state, and an actuator for selectively actuating the locking mechanism for transitioning the locking mechanism from the locked state to the unlocked state, such that selectively actuating the locking mechanism relieves the tensed relationship to allow the locking mechanism to transition from the locked state to the unlocked state.

In accordance with a related aspect, when the locking mechanism of the active hinge is in the unlocked state the hood bracket is allowed to move away from the body bracket by the actuator.

In accordance with a related aspect, the locking mechanism includes a moveable lever configured for movement between a locked position and an unlocked position, the moveable lever comprising an engagement surface for tensed engagement with the bolt when the moveable lever is in the locked position to establish the locking state of the locking mechanism.

In accordance with a related aspect, the tensed engagement of the bolt with the engagement surface of the moveable lever prevents a vibration of the moveable lever against the bolt.

In accordance with a related aspect, the locking mechanism includes a pawl configured for pivotal movement about a pivot axis between a locked position and an unlocked position, the pawl comprising an engagement surface for engagement with the bolt when the pawl is in the locked position to establish the locking state of the locking mechanism.

In accordance with a related aspect, the tensed relationship is established by a portion of the bolt exerting a force against the engagement surface of the pawl biasing the pawl away from the pivot axis of the pawl.

In accordance with a related aspect, the tensed relationship establishes a coefficient of friction between the bolt and the engagement surface of the pawl.

In accordance with a related aspect, the pawl has a hook portion having the engagement surface defining a pocket receiving the bolt.

In accordance with a related aspect, at least a portion of the bolt is in a path blocking a motion of the hook when the pawl is in the locked position.

In accordance with a related aspect, selectively actuating the locking mechanism causes the hook to bypass the portion of the bolt blocking the motion of the hook.

In accordance with a related aspect, the hook bypassing the portion of the bolt blocking the motion of the hook causes a localized deformation of at least one of the bolt and the pawl.

In accordance with a related aspect, the locking mechanism is maintained in the locked state without use of a spring.

In accordance with a related aspect, the tensed relationship is established when the pawl is in the locked position and a portion of the bolt is in an expanded state relative to the other portion of the bolt.

In accordance with a related aspect, the active hinge may further include at least one of a deploy bracket pivotally attached to the hood bracket and the body bracket, the hood bracket being pivotable relative to the deploy bracket between a non-deployed position and a deployed position, and at least one link interconnecting and pivotally connected to the deploy bracket and the body bracket, such that an additional tensed relationship is established between the bolt and at least one of the a deploy bracket and the at least one link.

Further areas of applicability will become apparent from the description provided. The description and specific examples in this summary are intended for purposes of illustration only and are not intended to limit the scope of the present disclosure.

DRAWINGS

The drawings described herein are for illustrative purposes only of selected embodiments and not all possible implementations thereof such that the drawings are not intended to limit the scope of the present disclosure.

FIG. 10A is a side schematic view illustrating a safety bolt positioned against a bracket and received by a pocket of a pawl prior to applying a compressive axial force to the safety bolt;

FIG. 10B is a side schematic view illustrating the safety bolt of FIG. 10A after a compressive axial force has been applied to the safety bolt;

FIG. 10C is a side schematic view illustrating the safety bolt of FIG. 10A after a compressive axial force has been applied to the safety bolt;

FIG. 21A is a schematic diagram of an active hinge having a locking mechanism in a locked state, in accordance with an illustrative embodiment;

FIG. 21B is a schematic diagram of an active hinge of FIG. 21A having a locking mechanism in an unlocked state, in accordance with an illustrative embodiment;

FIG. 22A is a schematic diagram of an active hinge having a linearly moveable locking mechanism in a locked state, in accordance with an illustrative embodiment;

FIG. 22B is a schematic diagram of an active hinge of FIG. 21A having a linearly moveable locking mechanism in an unlocked state, in accordance with an illustrative embodiment;

Corresponding reference numerals indicate corresponding parts throughout the several view of the drawings.

DETAILED DESCRIPTION

Example embodiments of a vehicle hood assembly having a hood and at least one active hinge embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms and that neither should be construed to limit the scope of the disclosure. In some example embodiments, well-known processes, well-known device structures, and well-known technologies are not described in detail.

As will be detailed, the active hinges of the present disclosure are used as part of a hood assembly for a pedestrian protection system on motor vehicles. More specifically, active hinges of the type disclosed herein are used for mounting a vehicle hood to a vehicle body in an effort to introduce an additional degree of freedom in the movement of the vehicle's hood when a pedestrian is struck by the vehicle to reduce the severity of injuries sustained when the pedestrian contacts the vehicle's hood.

Figure 1:
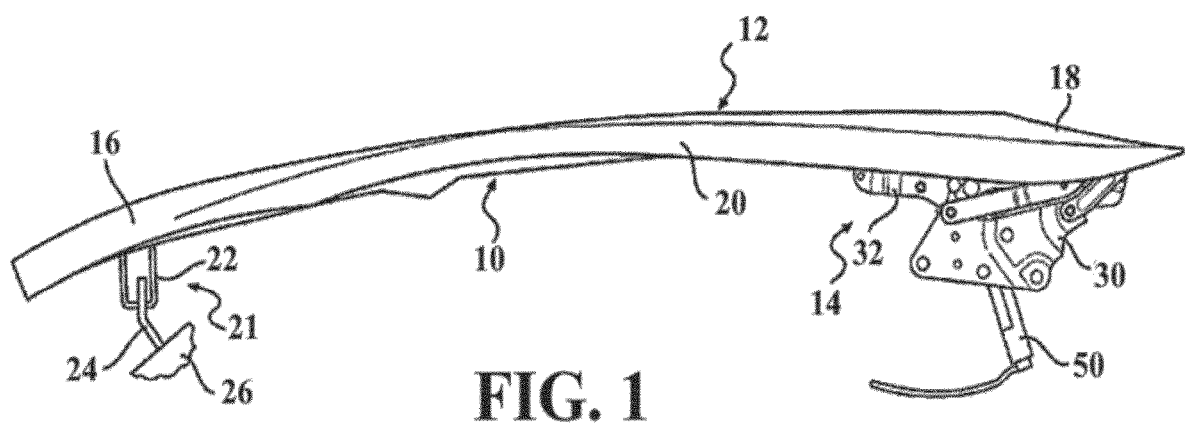
FIG. 1 is a first side front perspective view of a vehicle hood assembly having a hood and an active hinge constructed in accordance with the present disclosure and showing the vehicle hood assembly located in a normal-closed position with the hood in a latched condition and the active hinge in a non-deployed condition.

FIG. 1 illustrates a side elevational view of a vehicle hood assembly 10 generally configured to include a hood 12 and at least one active hinge 9. The term "vehicle" is intended to broadly encompass any car, truck, SUV, van or any other type of passenger carrying vehicle. Hood assembly 10 is configured to overlie an engine compartment of the vehicle, as defined by the vehicle's body. Hood 12 is shown to include a front segment 16, a rear segment 18 and a pair of laterally-spaced side segments 20. As is conventional, front segment 16 of hood 12 is configured to be located proximate to a front portion of the vehicle while rear segment 18 of hood 12 is configured to be located proximate to the vehicle's windshield.

In accordance with one example embodiment, a pair of active hinges 9 (only one shown) are associated with hood assembly 10, each being located adjacent to one of side segments 20 of hood 12 and being configured to allow hood 12 to pivot between an open position with front segment 16 elevated to provide access to engine compartment and a normal-closed position whereat hood 12 is lowered to provide an unobstructed view for the person operating the vehicle. FIG. 1 illustrates active hinge 9 positioned such that hood 12 pivots in proximity to its rear segment 18. The vehicle is also equipped with a hood latching device 21 shown to include a striker 22 fixed to an underside portion of front segment 16 of hood 12 and a latch 24 mounted to a structural portion 26 of the vehicle's body. In particular, FIG. 1 illustrates striker 22 engaged and held by latch 24 so as to located hood assembly 10 in its normal-closed position with active hinge 9 maintained in a "non-deployed" condition, whereby front segment 16 of hood is latched and rear segment 18 of hood 12 is located in its conventional lowered position.

Figure 2:
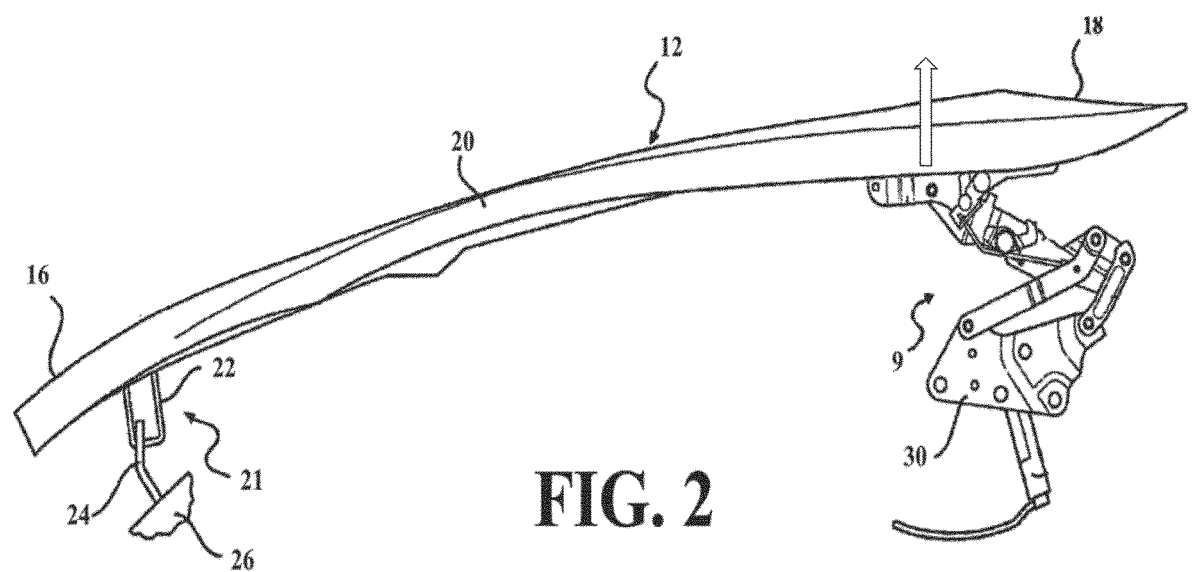
FIG. 2 is a similar first side perspective view as FIG. 1, now showing the vehicle hood assembly in a deployed position with the hood maintained in its latched condition and its rear edge segment raised and with the active hinge in a deployed condition.

As will be detailed, active hinge 9 includes a pedestrian protection device that functions automatically in the event of a vehicle impact with a pedestrian. Specifically, the pedestrian protection device functions to shift active hinge 9 from its non-deployed state into a "deployed" condition, as shown in FIG. 2, where rear segment 18 of hood 12 is moved to a raised or deployed position while front segment 16 of hood 12 remains latched via latching device 21. Thus, active hinge 9 provides an additional degree of freedom in its movement to permit rear segment 18 of hood 12 to move from its normal lowered position (FIG. 1) into its raised position (FIG. 2). As will also be detailed, under normal (i.e., pre-collision) situations, this additional degree of freedom is disabled by a primary latch of a latching mechanism associated with active hinge 9 which, in turn, permits normal usage of hood 12. Normal usage is understood to mean pivotal movement of hood 12 between its normally-closed position of FIG. 1 and a normally-opened position (not shown) with active hinge 9 maintained in its non-deployed state. Release of the primary latch (via an actuator) functions to initiate shifting of active hinge 9 from its non-deployed state to its deployed state.

Figure 3:
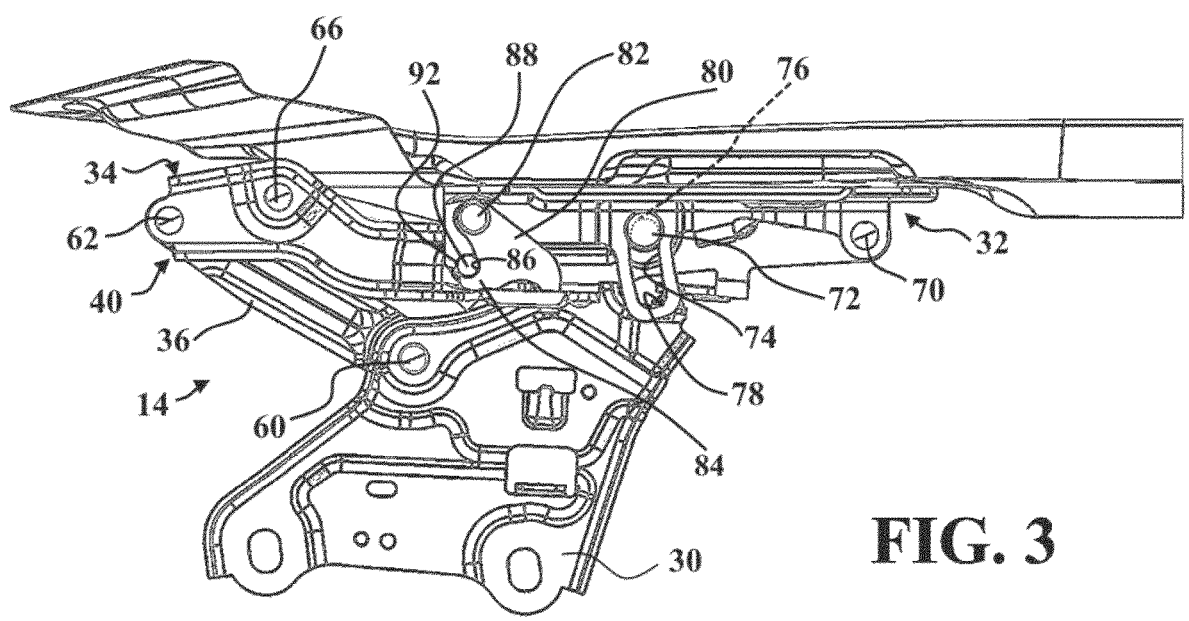
FIG. 3 is a first side view of a first example embodiment of an active hinge illustrating a pawl in a locked position and a hood bracket in a non-deployed position.
Figure 4:
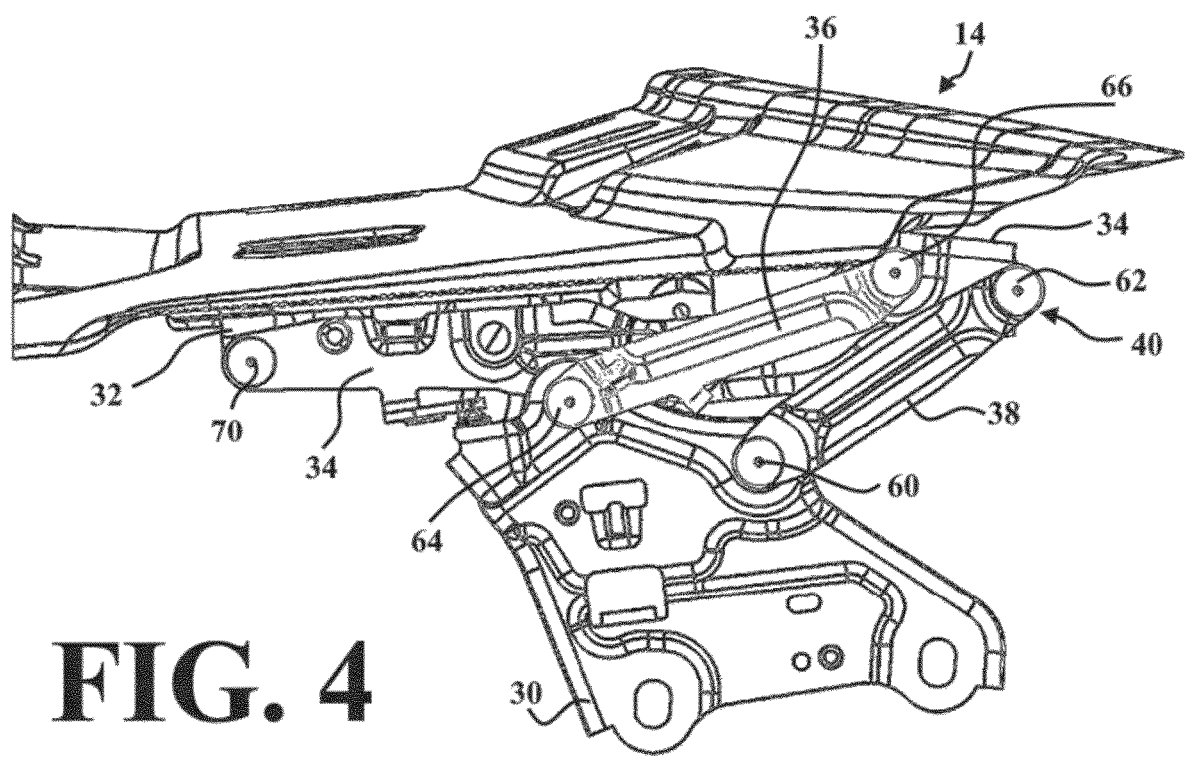
FIG. 4 is a second side view of the first example embodiment of an active hinge illustrating the pawl in the locked position and the hood bracket in a non-deployed position.

FIGS. 3-9 present a first embodiment of an active hinge 14 according to another aspect of the disclosure. FIG. 3 presents the active hinge 14 in its non-deployed condition. The active hinge 14 generally includes a body bracket 30, a hood bracket 32, a deploy bracket 34, and a pivot linkage mechanism interconnecting the body bracket 30 and deploy bracket 34. As best shown in FIG. 4, the pivot linkage mechanism includes a first link 36 and a second link 38 arranged to define a four-bar linkage 40. The first link 36 has one end pivotally connected to the body bracket 30 via a first pivot pin 60 and its opposite end pivotally connected to deploy bracket 34 via a second pivot pin 62. Similarly, second link 38 is shown having a first end pivotally connected to body bracket 30 via a first pivot pin 64 and its second end pivotally connected to deploy bracket 34 via a second pivot pin 66. A third pivot pin 70 pivotally connects a terminal end segment of deploy bracket 34 to the hood bracket 32.

With reference back to FIG. 3, a fourth pin 72 further interconnects the deploy bracket 34 and the hood bracket 32. The fourth pin 72 is spaced from the third pivot pin 70 along the hood bracket 32. The hood bracket 32 defines an elongated slot 74 that receives the fourth pin 72. The slot extends between a first end 76 and a second end 78. During pivoting of the hood bracket 32 relative to the deploy bracket 34 about the third pivot pin 70, the fourth pin 72 slides between, and is limited in movement by the first and second ends 76, 78 of the slot 74 to limit the rotational range of the hood bracket 32 relative to the deploy bracket 34 between a deployed position in which the fourth pin 72 engages the second end 78 of the slot 74, and a non-deployed position in which the fourth pin 72 engages the first end 76 of the slot 74.

Figure 5:
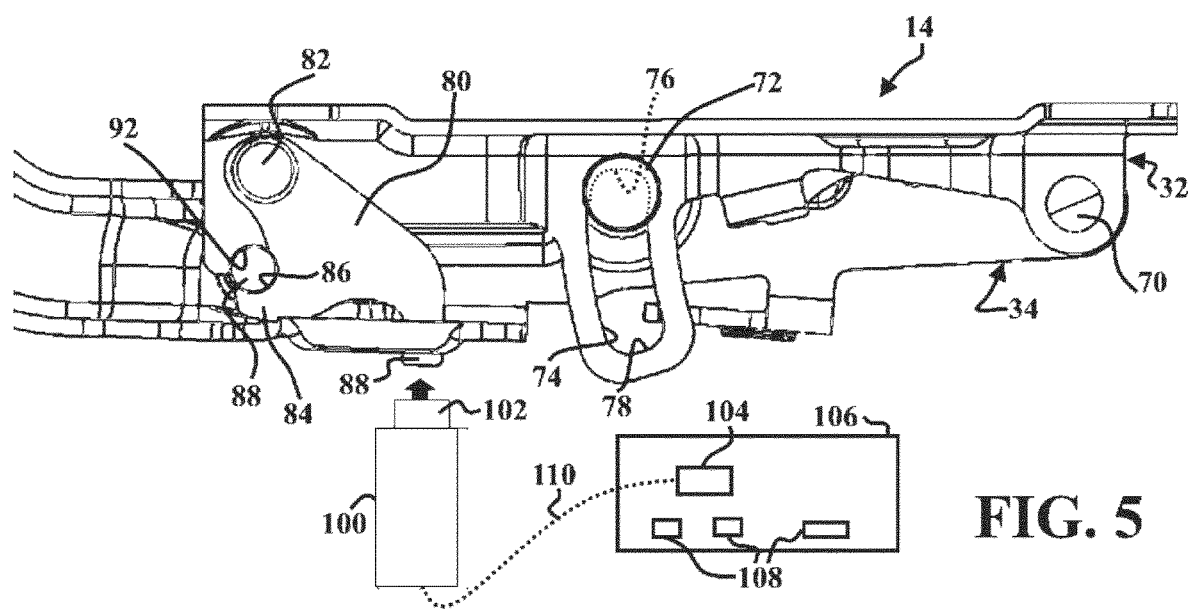
FIG. 5 is a magnified first side view of a hood bracket and deploy bracket of the first example embodiment of an active hinge illustrating the pawl in the locked position and the hood bracket in a non-deployed position, and further illustrating an actuator for rotating the pawl.
Figure 6:
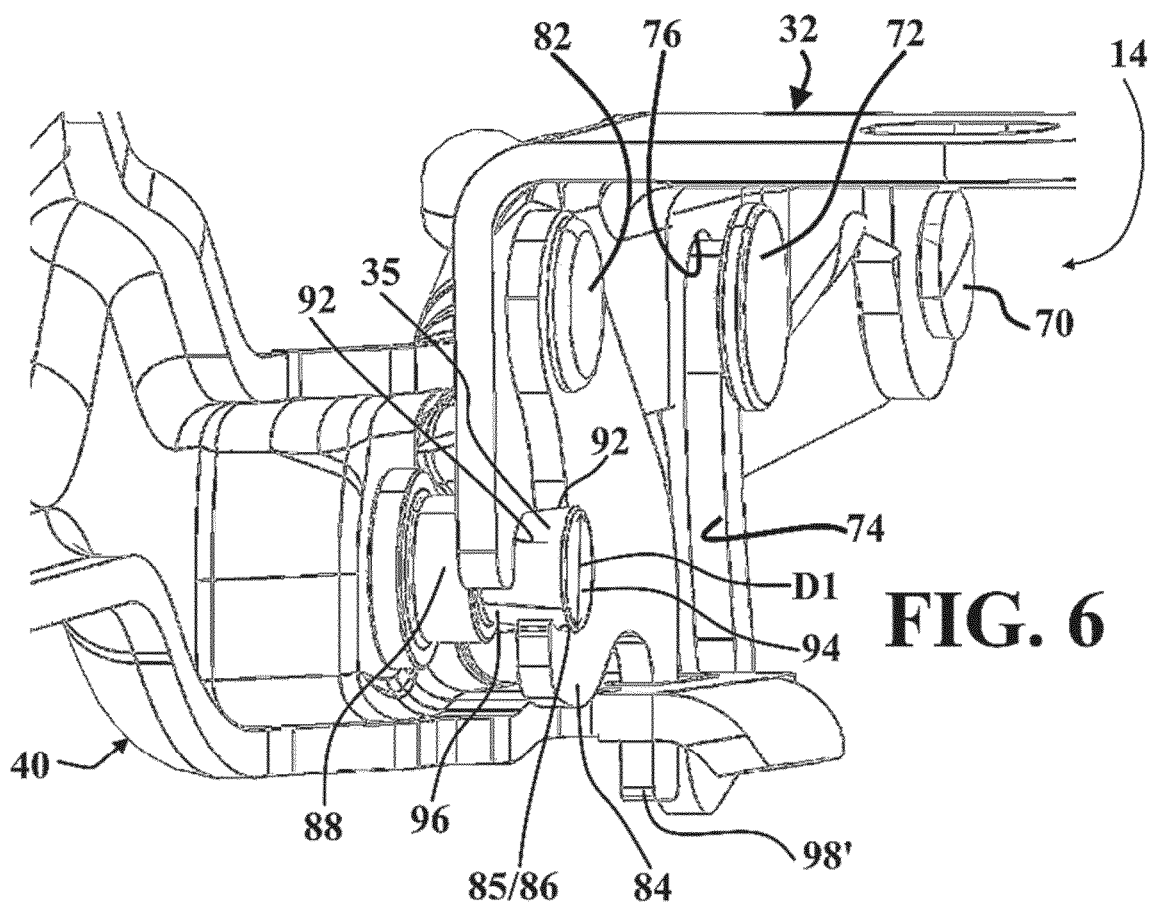
FIG. 6 is a front perspective view of the first example embodiment of an active hinge illustrating the pawl in the locked position and the hood bracket in a non-deployed position.
Figure 7A:
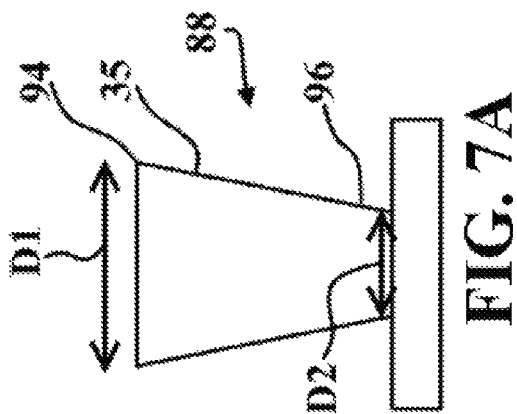
FIG. 7A is a side cross-sectional view of the bolt of FIG. 6.
Figure 7:
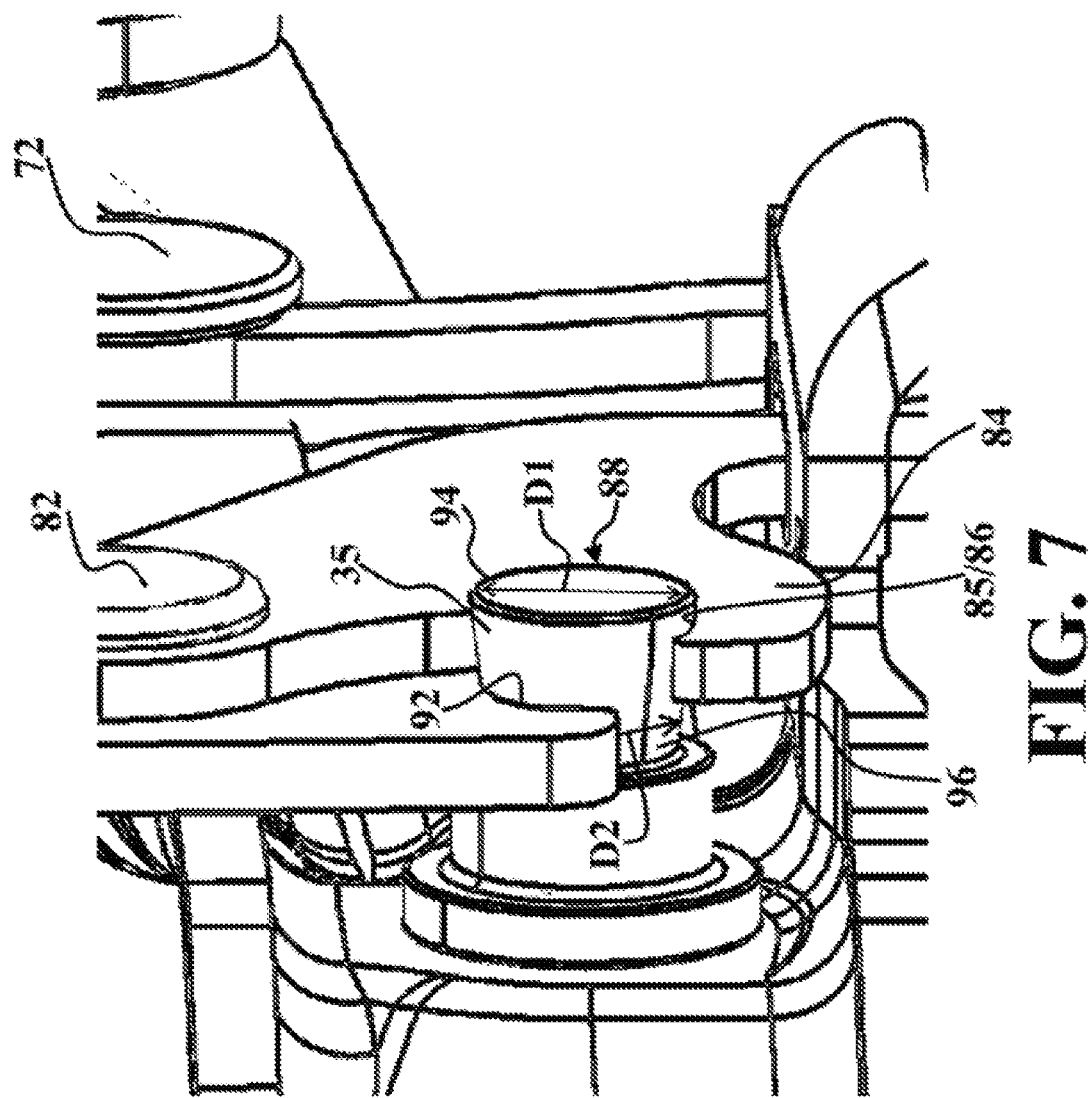
FIG. 7 is a magnified view of the pawl and a bolt of FIG. 6.
Figure 9:
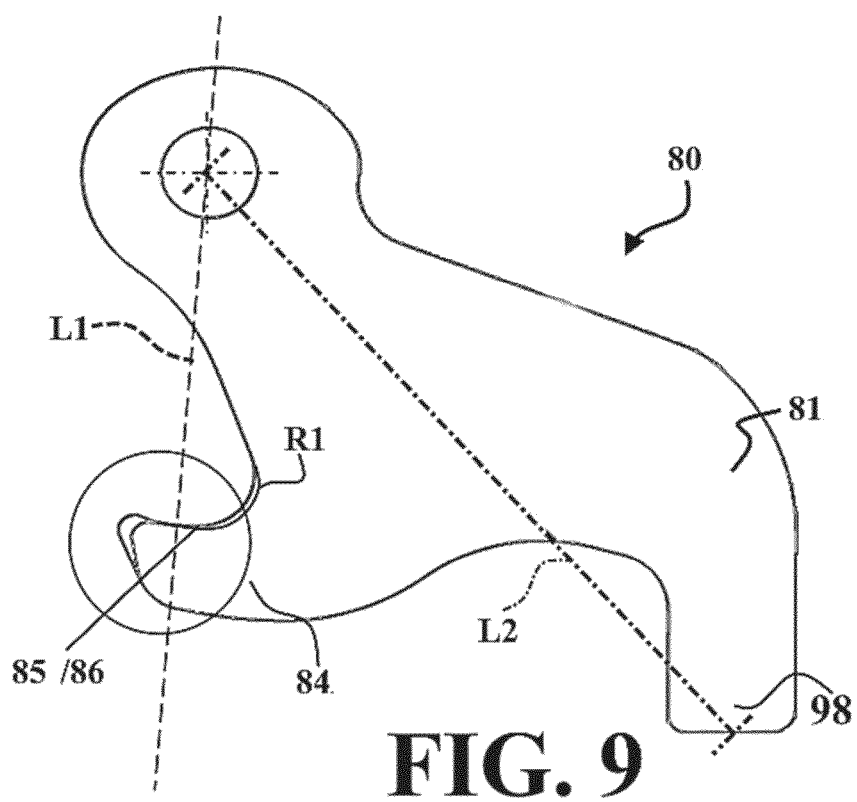
FIG. 9 is a first side view of the pawl of the first example embodiment of an active hinge.

A pawl 80, and example of a locking mechanism, is pivotally connected to the hood bracket 32 along a fifth pin 82. The pawl 80 acting as an illustrative type of moveable lever includes a hook portion 84 that has an engagement face 85 which defines a lower pocket 86. The hook portion 84 is spaced from the fifth pin 82. A safety bolt 88 is fixed to the deploy bracket 34. The hook portion 84 of the pawl 80 is configured to partially surround a bottom portion 90 of the safety bolt 88, while the pawl 80 is positioned in a locked position (e.g., as shown in FIGS. 5-7), such that the safety bolt 88 is received by the lower pocket 86 of the pawl 80 to inhibit pivoting of the hood bracket 32 relative to the deploy bracket 34 about the third pivot pin 70. More particularly, according to this embodiment, the lower pocket 86 surrounds approximately half of the safety bolt 88. As best illustrated in FIG. 6, the hood bracket 32 defines an upper pocket 92 that is configured to partially surround a top portion 91 of the safety bolt 88 while the hood bracket 32 is in the non-deployed position. As best illustrated in FIGS. 6-7A, the safety bolt 88 has a generally frusto-conical shape and tapers from a wider portion 94 spaced from the deploy bracket 34 to a narrower portion 96 coupled with and received by the deploy bracket 34 along a tapered region 35. The wider portion 94 has a first diameter D1 that is larger than a second diameter D2 of the narrower portion 96. According to an embodiment, during assembly of the active hinge 14, the safety bolt 88 initially has a generally cylindrical shape, and is riveted or otherwise coupled to the deploy bracket 34 to provide an axial compressive force thereto, creating the tapered wall of the safety bolt 88 to drive flared portion of the safety bolt against the engagement face 85 of the pawl 80 to establish a tensed relationship(s), where a movement of the pawl 80 due to the expanded bolt is prevented by the secured fixing of the pawl 80 about the pivot axis 82. According to an embodiment, during assembly of the active hinge 14, the safety bolt 88 initially has a generally cylindrical shape, and is riveted or otherwise coupled to the deploy bracket 34 to provide an axial compressive force thereto, creating the tapered wall of the safety bolt 88 to drive the pawl 80 and deploy bracket 34 in opposite directions from one another to fix the hood bracket 32 in the non-deployed position to establish tensed relationship(s). It should be appreciated that the safety bolt 88 may have other tapered shapes, and the tapered shape may be provided in other ways. Tapered shapes may include a budging shape with a gradual reduction in thickness, or an abrupt reduction in thickness, or an uneven reduction in thickness. As illustrated in FIG. 9, the hook portion 84 and lower pocket 86 of the pawl 80 generally have an arc shape with a radius of curvature that is sized such that the tapered safety bolt 88 may be received and secured within the pocket 86 of the pawl 80. It should be appreciated that fixing the hood bracket 32 in the non-deployed position in this manner with the frustoconical shaped safety bolt 88, and arc-shaped pocket 86 of the pawl 80 advantageously eliminate the need for a spring to hold the hood bracket 32 in the non-deployed position, and prevents noise, rattling and vibrations because the components of the active hinge 14 are held in tension. Holding the components of the active hinge 14 in tension in this manner also eliminates tolerances. Other types of locking mechanisms may be provided in tensed relationship with the bolt 88, such as a sliding lever 77 configured to linearly move having a protrusions for engaging the bolt 88, or a sliding mechanism having detents for engaging the bolt 88, or a rotating mechanism having detents for receiving a portion of the bolt 88 (see for example FIGS. 22A and 22B), as examples and without limitation.

It should be appreciated that the safety bolt 88 may be pre-compressed into position during early stages of manufacturing, or after all of the components of the active hinge 14 are assembled and with the pawl 80 in the locked position. More particularly, as illustrated in FIGS. 10A-10B, during assembly of the active hinge 14, the safety bolt 88 is aligned with/positioned in the lower pocket 86 of the pawl 80 (FIG. 10A). Subsequently, as shown in FIG. 10B, the safety bolt 88 is axially crushed to form its frusto-conical shape, which causes the safety bolt 88 to be locked within the pocket 86 of the pawl 80. As a result, any radial clearance between the safety bolt 88 and pawl 80 is eliminated, therefore providing an anti-chucking effect.

Figure 11:
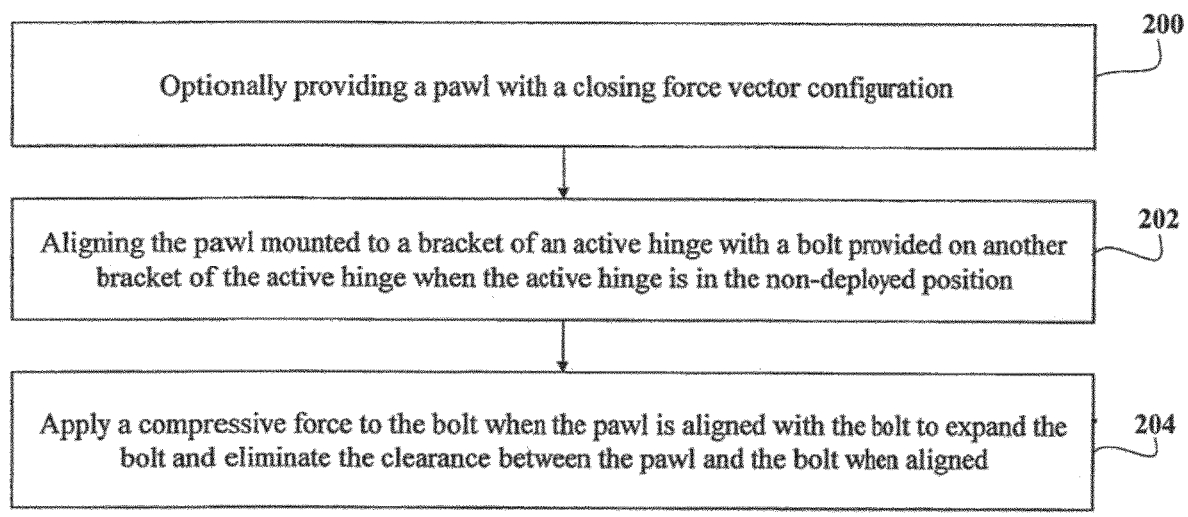
FIG. 11 is a flow diagram illustrating a method of aligning a safety bolt relative to a bracket and pawl and applying a compressive force to the safety bolt.

FIG. 11 presents a method of assembling the active hinge 14 according to an aspect of the disclosure. The method includes 200 providing a pawl 80 with a closing force vector configuration. The method continues with 202 axially aligning the pocket 86 of the pawl 80 with the safety bolt 88. As will be clarified below, it should be appreciated that the pawl 80 and safety bolt 88 may be attached to any of the brackets 30, 32, 34 or links 36, 38, but should be positioned on different brackets 30, 32, 34 and links 36, 38 than one another. The method continues with 204 applying an axial compressive force to the safety bolt 88 when the pocket 86 of the pawl 80 is aligned with the safety bolt 88 to expand the safety bolt 88 and eliminate radial gaps between the safety bolt 88 and pawl 80.

Figure 8:
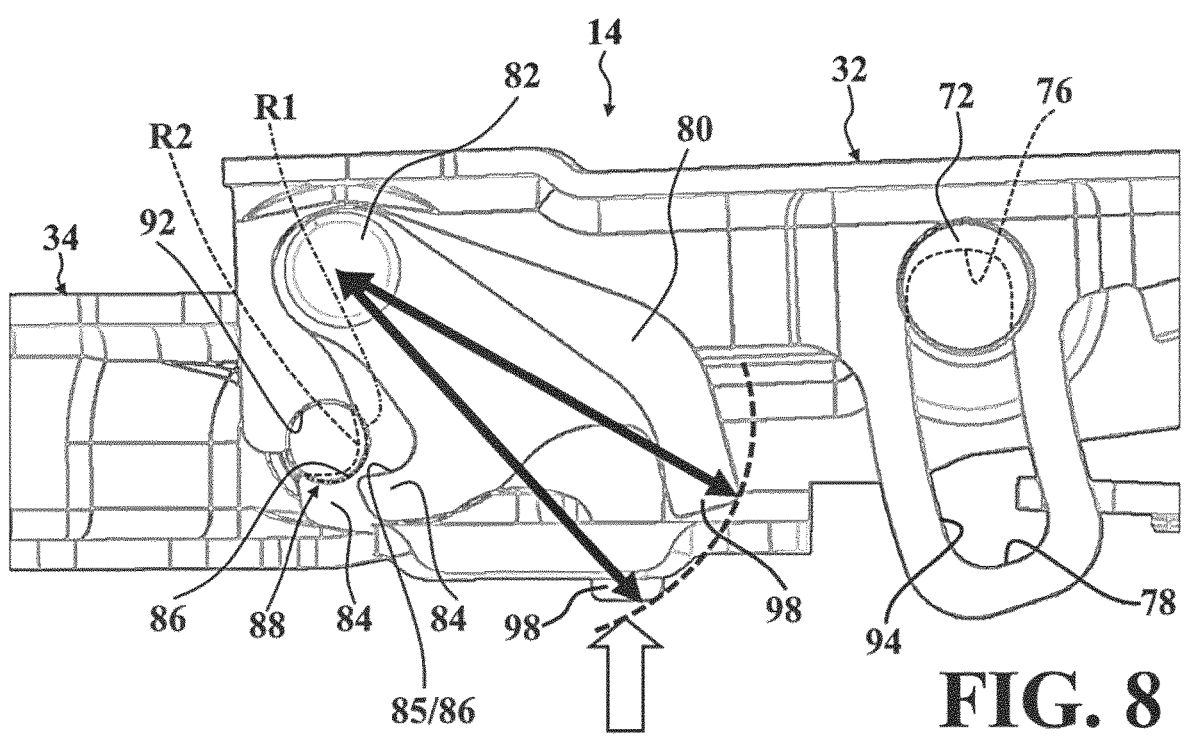
FIG. 8 is a magnified view of the hood bracket, deploy bracket, pawl and bolt of FIG. 1, illustrating rotation of the pawl from a locked position to an unlocked position in response to engagement by an actuator.

As best shown in FIGS. 5 and 8-9, the pawl 80 further includes a contact face 98 that is spaced from the fifth pin 82 and the hook portion 84 of the pawl 80. As shown, a first distance L1 between the pivot fifth pin 82 and the engagement face 85 is about twice that of a second distance L2 between the fifth pin 82 and the contact face 98. An actuator 100 is positioned in alignment with the contact face 98. The actuator 100 includes a linearly extendable contact member 102 for engaging the contact face 98 to cause the pawl 80 to rotate about the fifth pin 82 from the locked position into an unlocked position (illustrated in FIG. 8). Rotating the pawl 80 into the unlocked position allows the hood bracket 32 to pivot about the third pivot pin 70 relative to the deploy bracket 34 to allow the hood bracket 32 and hood to move into the deployed position. It should be appreciated that other components of the active 14 may be configured to move relative to one another in a similar manner in response to actuation of the actuator 100 or other actuators. As schematically illustrated in FIG. 5, the actuator 100 is configured to selectively actuate in response to a control signal being provided by a controller 104 associated with an active passenger protection control system 106 in response to one or more vehicle-mounted sensors 108 or other detection devices detecting the occurrence of a pedestrian collision. In the example shown, the actuator 100 includes an electrical connector 110 that would be in electrical connection with the sensor(s) 180 and/or the controller 104 such that an electrical control signal is generated to control actuation of the actuator 100.

It should be appreciated that a one-joint assembly may be utilized as an alternative to the four-bar linkage 40 of the first embodiment of the active hinge 14.

Figure 17:
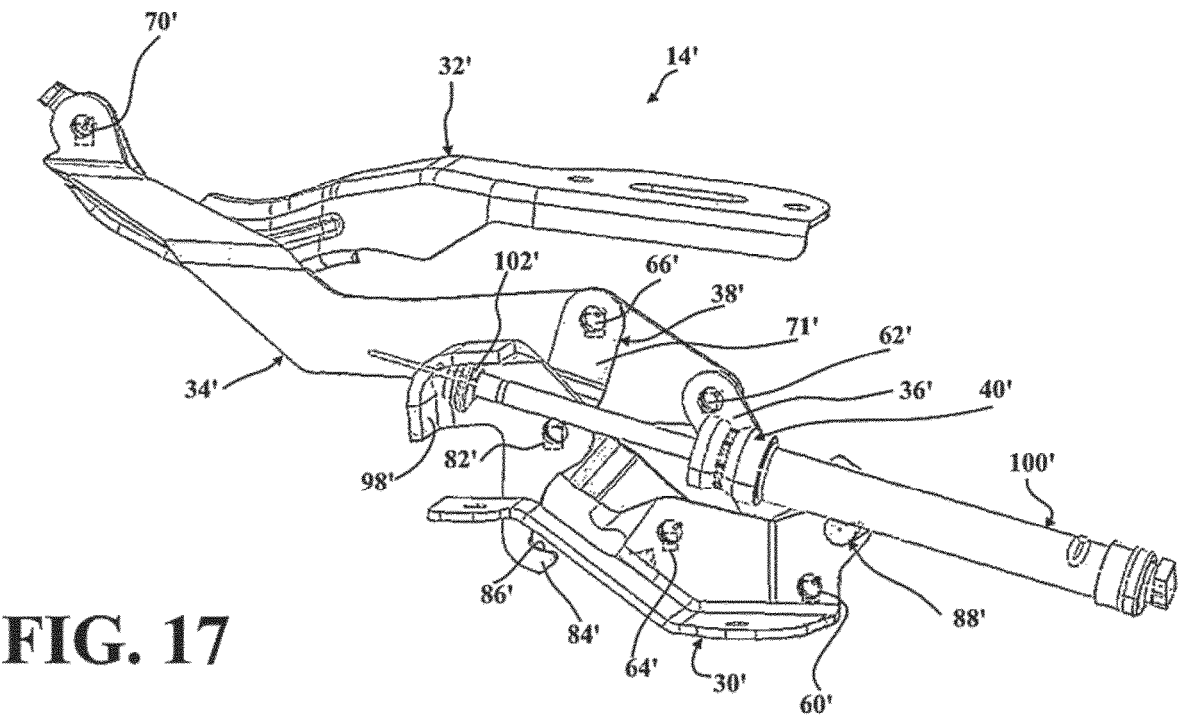
FIG. 17 is a first side perspective view of the second example embodiment of an active hinge illustrating the pawl in an locked position and the hood bracket in a deployed position.
Figure 18:
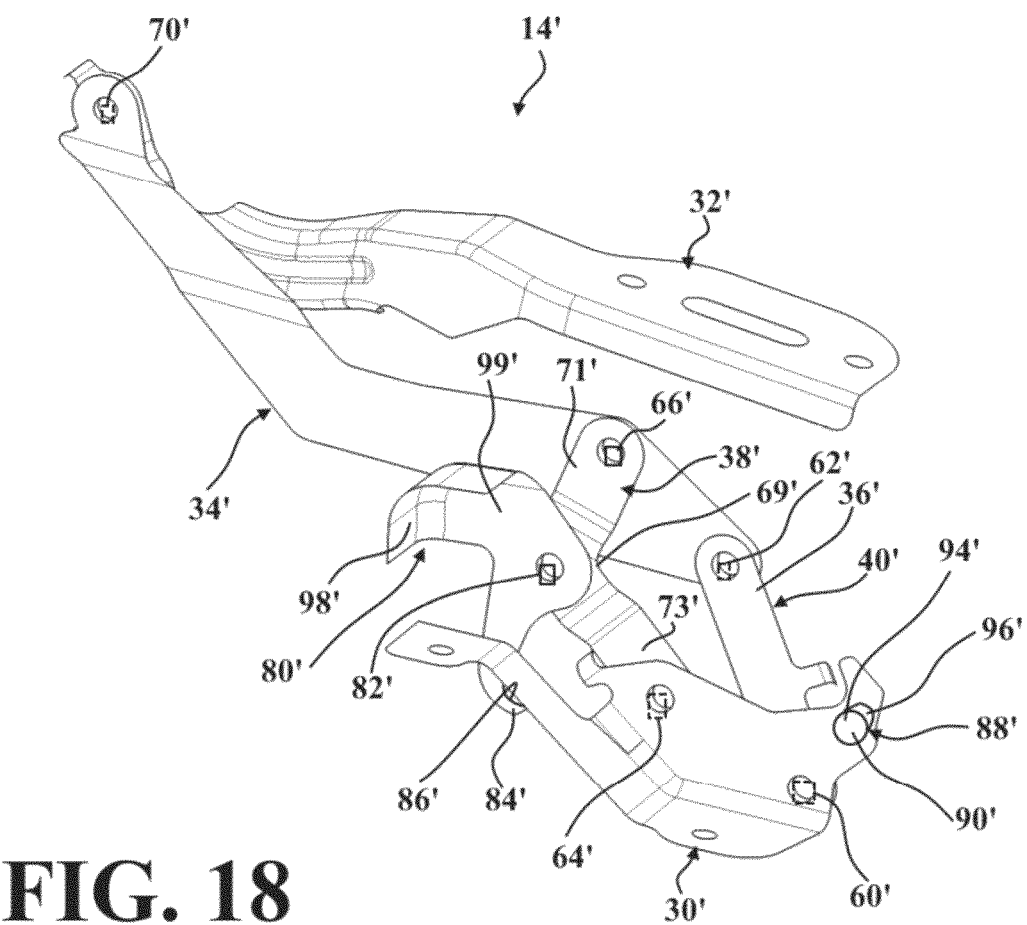
FIG. 18 is a first side perspective view of the second example embodiment of an active hinge illustrating the pawl in an locked position and the hood bracket in a deployed position, and not including the actuator.

FIGS. 12-18 disclose a second embodiment of an active hinge 14' according to another aspect of the disclosure. As best illustrated in FIG. 18, similar to the first embodiment of an active hinge 14, the active hinge 14' generally includes a body bracket 30', a hood bracket 32', a deploy bracket 34', and a pivot linkage mechanism interconnecting the body bracket 30' and deploy bracket 34'. The pivot linkage mechanism includes a first link 36' and a second link 38' arranged to define a four-bar linkage 40'. The first link 36' has one end pivotally connected to the body bracket 30' via a first pivot pin 60' and its opposite end pivotally connected to the deploy bracket 34' via a second pivot pin 62'. Similarly, second link 38' is shown having a first end pivotally connected to body bracket 30' via a first pivot pin 64' and its second end pivotally connected to deploy bracket 34 via a second pivot pin 66'. The second link generally has an "L" shape and defines an elbow portion 69' between first and second linear segments 71',72' that extend generally perpendicularly to one another. A third pivot pin 70' pivotally connects a terminal end segment of deploy bracket 34' to the hood bracket 32'.

According to the second embodiment of the active hinge 14', there is no fourth pin and corresponding slot 74 limiting pivoting movement of the hood bracket 32' relative to the body bracket' about the third pivot pin 70' like in the first embodiment of the active hinge 14.

Figure 12:
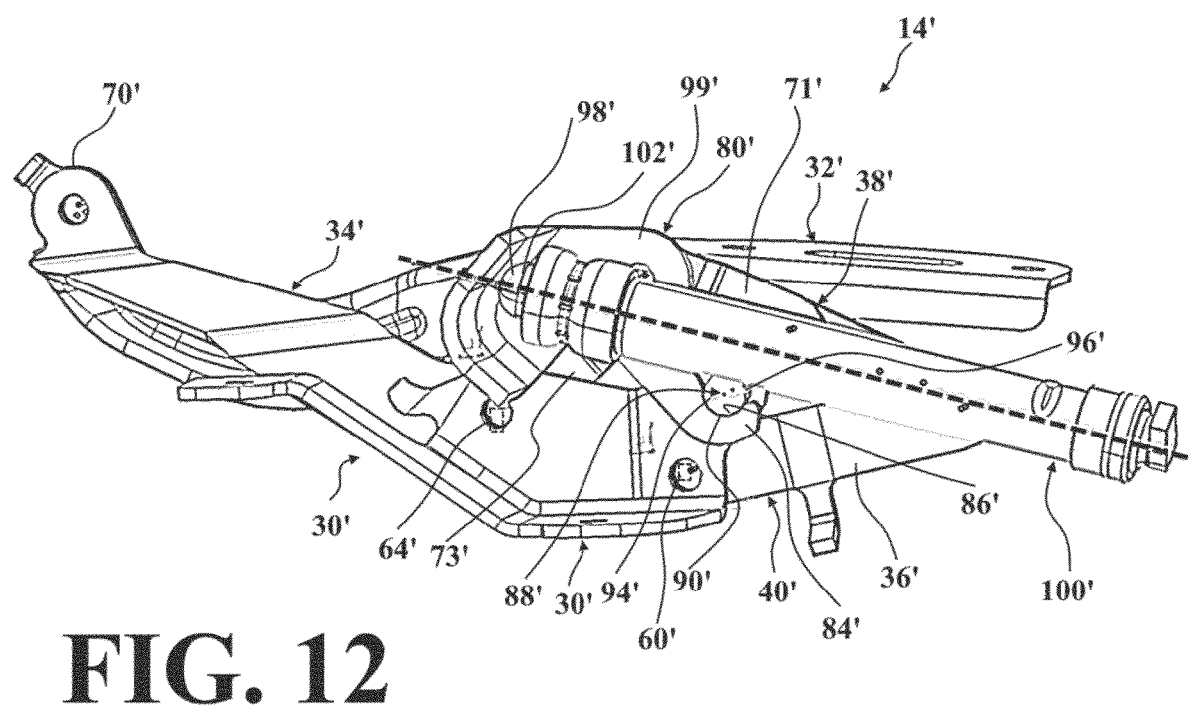
FIG. 12 is a first side perspective view of a second example embodiment of an active hinge illustrating a pawl in a locked position and a hood bracket in a non-deployed position.
Figure 13:
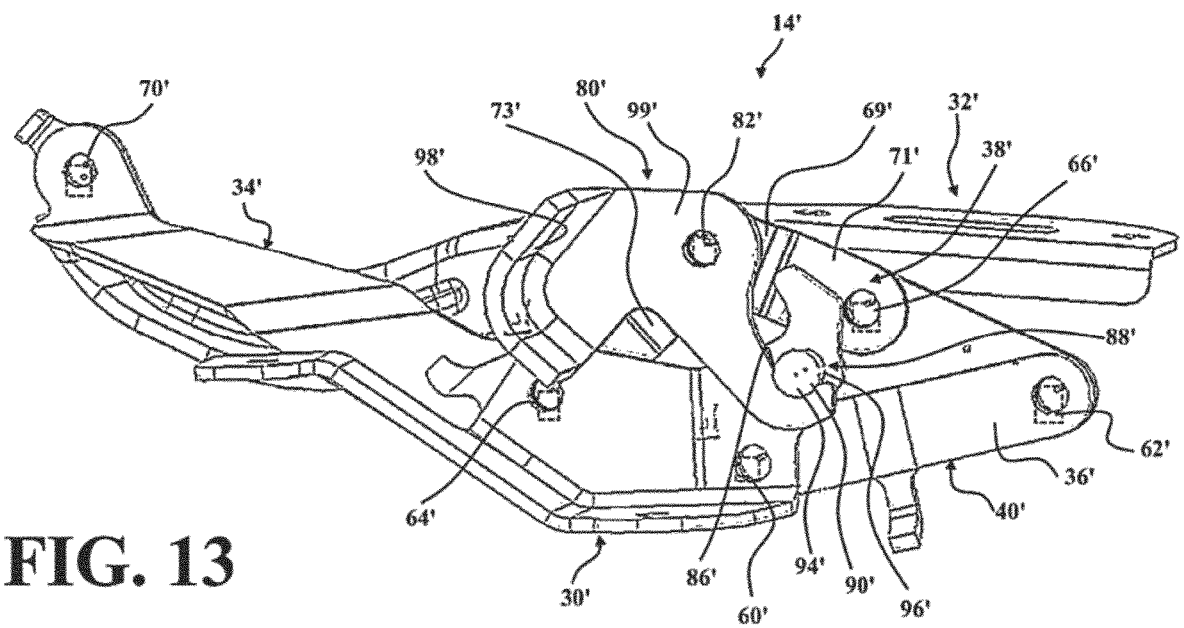
FIG. 13 is a first side perspective view of the second example embodiment of an active hinge illustrating the pawl in the locked position and the hood bracket in the non-deployed position, and not including the actuator.
Figure 14:
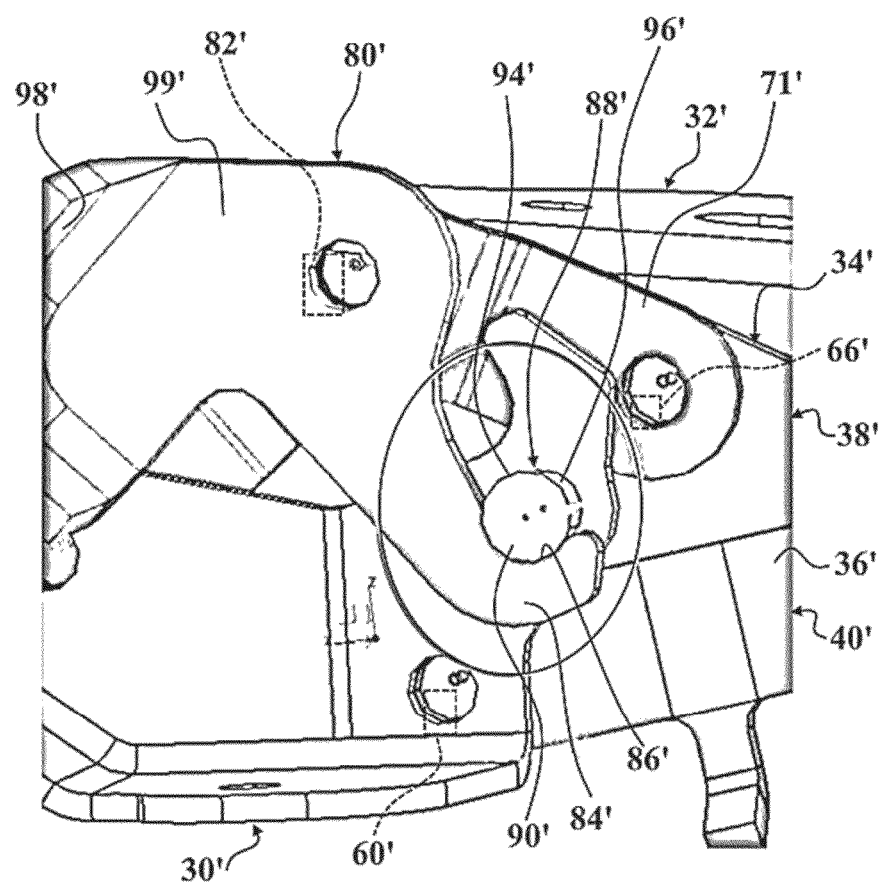
FIG. 14 is a magnified view of the pawl and a bolt of FIG. 11.

A pawl 80' is pivotally connected to the elbow portion 69' of the of the second link 38' along a fifth pivot pin 82'. The pawl 80' includes a hook portion 84' that has an engagement face 85' that defines a lower pocket 86'. The hook portion 84' is spaced from the fifth pin 82'. A safety bolt 88' is fixed to the body bracket 30'. The lower pocket 86' of the hook portion 84' of the pawl 80' is configured to partially surround a bottom portion 90' of the safety bolt 88', while the pawl 80' is positioned in a locked position (e.g., as shown in FIGS. 12-14), such that the safety bolt 88' is received by the lower pocket 86' of the pawl 80' to inhibit pivoting of the second link 38' and deploy bracket 34' relative to the body bracket 30' about the third pivot pin 70'. Like the first embodiment of the active hinge 14', the safety bolt 88' has a generally frustoconical shape and tapers between a wider portion 94' spaced from the body bracket 30' to a narrower portion 96' coupled with the body bracket 30'. The wider portion 94' has a larger diameter than the narrower portion 96'. During assembly of the active hinge 14', the safety bolt is riveted or otherwise connected to the body bracket 30' such that the tapered wall of the safety bolt 88' drives the pawl 80' downwardly to fix the deploy bracket 34' in the non-deployed position relative to the body bracket 30'. It should be appreciated that fixing the deploy bracket 34' in the non-deployed position in this manner with the frustoconical shape safety bolt 88' advantageously eliminates the need for a spring to hold the deploy bracket 34' in the non-deployed position and prevents noise, rattling and vibrations because the components of the active hinge 14' are held in tension. Holding the components of the active hinge in tension in this manner also eliminates tolerances.

It should also be appreciated that, according to either of the aforementioned embodiments, the safety bolt 88, 88' may be pre-compressed into position as discussed during early stages of manufacturing or after all of the components of the active hinge 14, 14' are assembled and with the pawl 80, 80' in the locked position. Alternatively, the safety bolt 88, 88' may be fabricated such that it tapers prior to being installed on the active hinge 14, 14', with the safety bolt 88, 88' driving the pawl 80, 80' into an opposite direction as the opposing component of the active hinge 14, 14' during axial movement of the safety bolt 88, 88' to create tension in the components of the active hinge 14, 14'.

Figure 15:
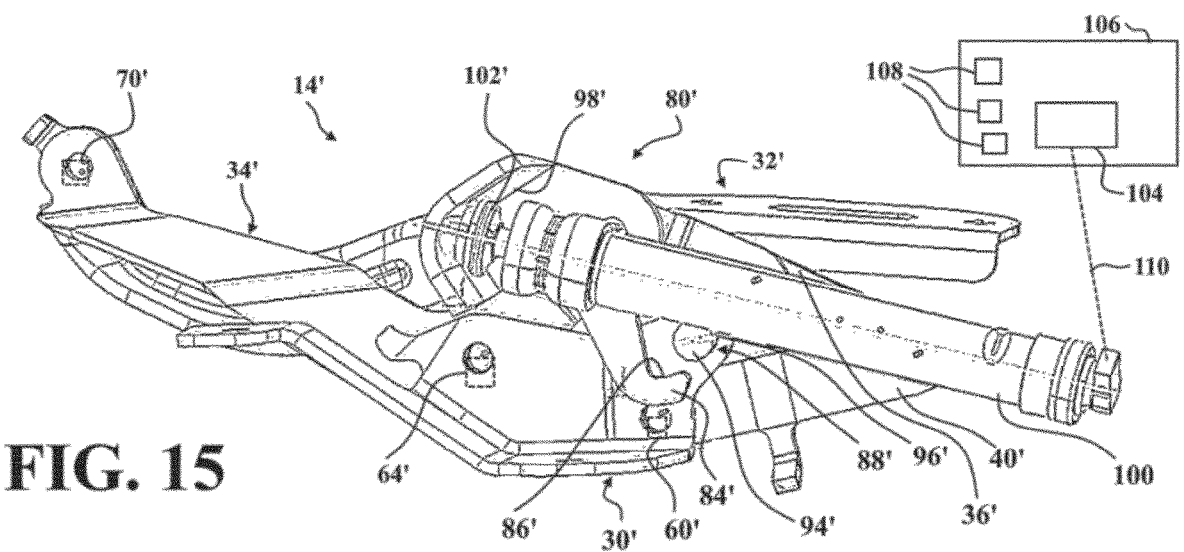
FIG. 15 is a first side perspective view of the second example embodiment of an active hinge illustrating the pawl in an locked position and the hood bracket in the non-deployed position.
Figure 16:
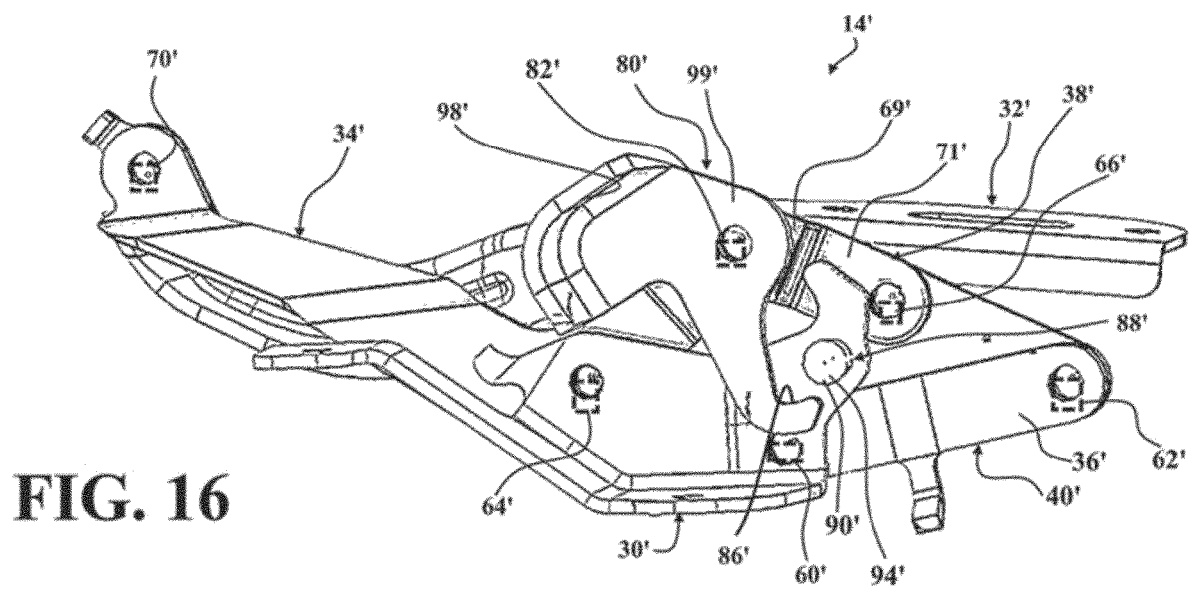
FIG. 16 is a first side perspective view of the second example embodiment of an active hinge illustrating the pawl in a locked position and the hood bracket in the non-deployed position, and not including the actuator.

The pawl 80' further includes a contact face 98' that is spaced from the fifth pin 82' and the hook portion 84' of the pawl 80'. According to this embodiment, the contact face 98' extends transversely from a planar body portion 99' of the pawl 80'. As best illustrated in FIGS. 12, 15 and 17, an actuator 100' is positioned in alignment with the contact face 98'. The actuator 100' includes a linearly extendable contact member 102' for engaging the contact face 98' to cause the pawl 80' to rotate about the fifth pin 82' from the locked position into an unlocked position (illustrated in FIGS. 15-18). Rotating the pawl 80' into the unlocked position allows the second link 38' to pivot about the first pivot pin 64', and thus allows the deploy bracket 34' to pivot into the deployed position, thus also allowing the hood bracket 32' and hood to move into the deployed position. It should be appreciated that other components of the active 14' may be configured to move relative to one another in a similar manner in response to actuation of the actuator 100' or other actuators.

It should be appreciated that the pawl 80, 80' of both embodiments of active hinge 14, 14' require a small release angle to be rotated into the unlocked position due to the relative positions between the contact face 98, 98', the pocket 86, 86' and the fifth pin 82, 82'. Accordingly, only a small actuator stroke is required to rotate the pawl 80, 80' into the unlocked position.

As schematically illustrated in FIG. 15, the actuator 100' is configured to selectively actuate in response to a control signal being provided by a controller 104' associated with an active passenger protection control system 106' in response to one or more vehicle-mounted sensors 108' or other detection devices detecting the occurrence of a pedestrian collision. In the example shown, the actuator 100 includes an electrical connector 110 that would be in electrical connection with the sensor(s) 180 and/or the controller 104 such that an electrical control signal is generated to control actuation of the actuator 100'.

It should be appreciated that the pawl 80, 80' and safety bolt 88, 88' may alternatively be placed on another of the body bracket, 30, hood bracket 32, deploy bracket 34 or links 36, 38 without departing from the scope of the subject disclosure. It should also be appreciated that the second embodiment of an active hinge 14' may be assembled in accordance with the method presented in FIG. 11.

Figure 19:
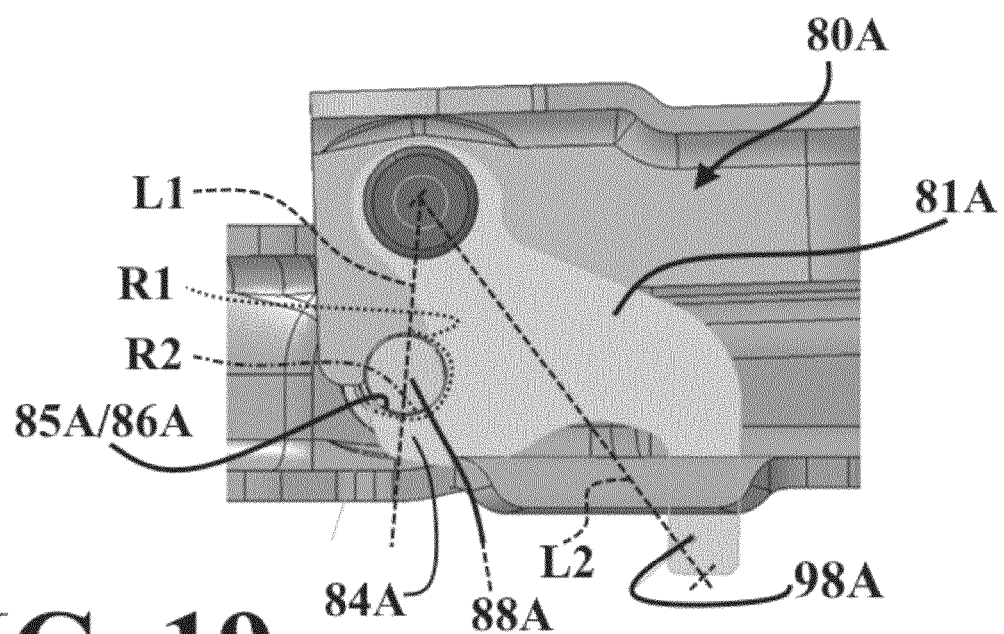
FIG. 19 is a first side view of a third example embodiment of a pawl having an extended hook portion and contact face.
Figure 20:
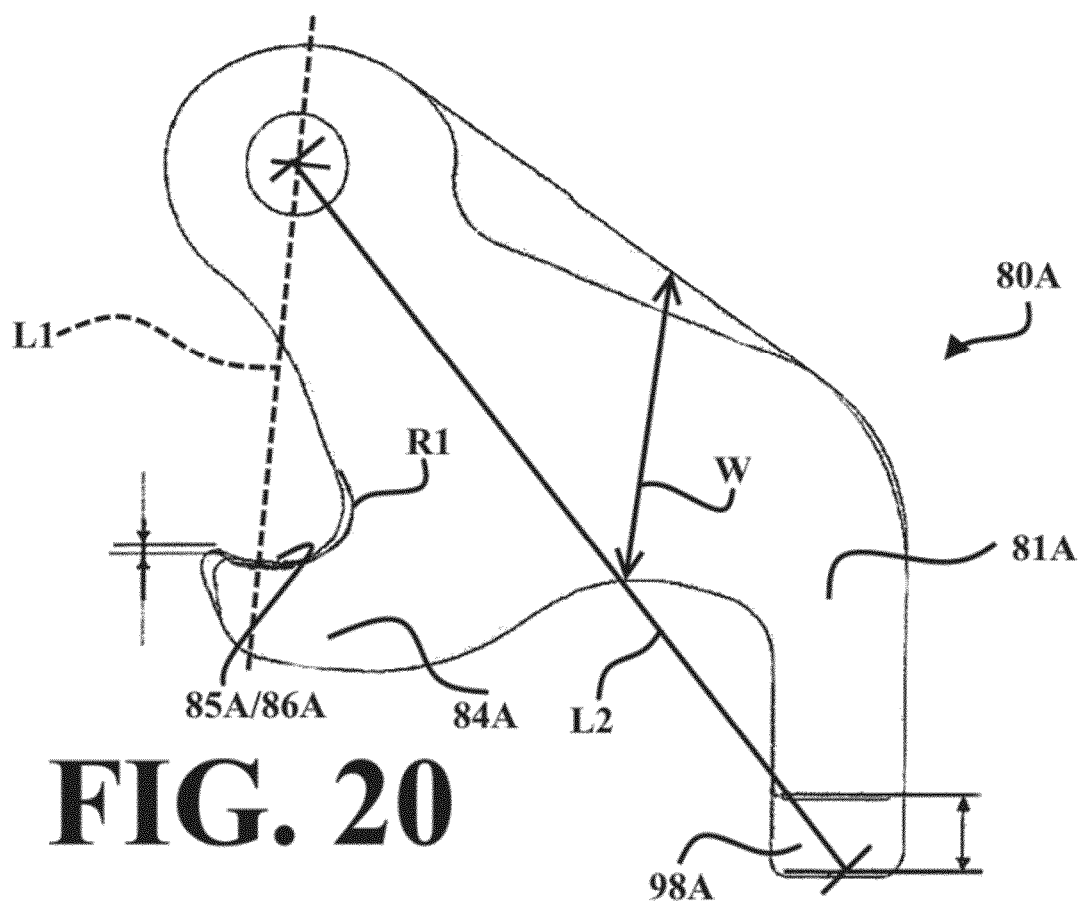
FIG. 20 is another first side view of the third example embodiment of a pawl having an extended hook portion and contact face.

FIGS. 19-20 present a third embodiment of a pawl 80A according to an aspect of the disclosure. According to this embodiment, the lower pocket 86A of the hook portion 84A of the pawl 80A is extended such that it surrounds more than half of the outer circumference of the safety bolt 88 to provide increased locking security while the pawl 80A is positioned in the locked position. As shown, a first distance L1 between the pivot fifth pin 82 and the engagement face 85 is more than twice that of a second distance L2 between the fifth pin 82 and the contact face 98. This provides a further reduced actuator stroke length for moving the pawl 80A from the locked to unlocked position.

Now referring to FIG. 21A and FIG. 21B, in addition to FIGS. 1 through 20, an active hinge 9 is provided and includes a hood bracket 32 for attachment to a vehicle hood 12, a body bracket 30 for attachment to a vehicle body, and may include a number of intermediary components such as bracket 34 and linkages 36, 38, for example. A locking mechanism 200, for example pawl 80, is coupled between the hood bracket 32 and the body bracket 30, the locking mechanism 200 comprising an unlocked state for example as shown in FIGS. 8 and 15 for allowing the hood bracket 32 to move away (e.g. upwardly) from the body bracket 30 and a locked state for example as shown in FIG. 5 and FIG. 13 preventing the hood bracket 32 to move away from the body bracket 30, the locking mechanism 200 further comprising a bolt 88 in a tensed relationship with the locking mechanism 200 for maintaining the locking mechanism 200 in the locked state. An actuator 100 is provided for selectively actuating, for example a pyrotechnic actuator deploying a plunger in response to receiving an electrical signal corresponding to a detection of a pedestrian impact from a controller 300 or by a body control module (BCM), the locking mechanism for transitioning the locking mechanism 200 from the locked state to the unlocked state, such that the selectively actuating the locking mechanism 200 relieves the tensed relationship to allow the locking mechanism 200 to transition from the locked state to the unlocked state, and allow the hood 12 to be deployed to an active pedestrian protection position as shown in FIG. 21B (illustrating the hood 12 allowed to move upwards by a continued actuation of actuator 100, or by another actuation system/mechanism not shown). During the relief of the tensed relationship, for example the pawl 80 disengaging the bolt 88, the tension may momentarily increase or the tension may remain the same, or the tension may decrease, depending on the geometry of the pawl 80 and desired level of safety and the size of the actuator 100. The locking mechanism 200 may include a moveable lever, illustrated as a pivotal pawl 80, configured for movement (e.g. linear movement or rotational movement) between a locked position and an unlocked position, with the moveable lever having an engagement surface, also referred to hereinabove as engagement face 85, for tensed engagement with the bolt 88 when the moveable lever is in the locked position to establish the locking state of the locking mechanism 200. The configuration whereby the moveable lever is a pawl 80 configured for pivotal movement about a pivot axis 82 between a locked position and an unlocked position, the pawl 80 has an engagement surface, for example engagement face 85, for engagement with the bolt 88 when the pawl 80 is in the locked position to establish the locking state of the locking mechanism 200, with the tensed relationship established by a portion of the bolt 88, for example shown as approximately 50% of the outer circumferential surface of the bolt 88 as seen in FIG. 8 exerting a force F against the engagement surface 85 of the pawl 80 biasing the pawl 80, for example via the engagement surface 85, away from the pivot axis 82. The tensed relationship, for example due to the expansion forces of the bolt 88 acting on the pawl 80, is established when the pawl 80 is in the locked position and a portion (e.g. flared head) of the bolt 88 is in an expanded state relative to the other portion of the bolt 88 (e.g. unflared stem). Illustratively as shown in FIG. 10B the expanded state of the bolt 88 is shown as a flared head portion, or top portion 91, due to an applied compression of the bolt 88 in a pre-assembly state where the bolt 88 may be for example a linear pin or straight cylindrical structure, for example during positioning of the pawl 80 in the locked position, to deform the pin to an assembled state where it may engage with upper pocket 92. A further applied compression of the bolt 88 may be provided to further spread out the upper pocket 92 to further engage the planar surface 95 of the pawl 80, as shown in FIG. 10C. The pawl 80 has a hook portion 84 having the engagement surface defining a pocket 86 receiving the bolt 88, and for example partially receiving the bolt 88, such that at least a portion of the bolt 88 is in a path blocking a motion of the hook (e.g. counterclockwise as shown in FIG. 8) when the pawl 80 is in the locked position, for preventing vibrations due to movement e.g. chucking of the pawl 80 against the bolt 88. The at least a portion of the bolt 88 may remain in a path blocking a motion of the hook 84 (e.g. counterclockwise as shown in FIG. 8) when the pawl 80 is being moved from the locked position towards the unlock position. Selectively actuating the locking mechanism 200 e.g. releasing the locking mechanism 200 causes the hook 84, which may be for example the tip of hook 84, to bypass the portion of the bolt 88 blocking the motion of the hook 84, such that the hook 84 bypassing the portion of the bolt 88 blocking the motion of the hook 84 causes a localized deformation of at least one of the bolt 88 and the pawl 80. As a result of the tensed relationship established between the pawl 80 and the bolt 88, the pawl 80 may be maintained in the locked position without use of a spring, for example which may otherwise be required to bias the pawl 80 in the clockwise direction as viewed in FIG. 8 and prevent vibrations. The use of a bolt in lieu of a spring is lower cost and easier to assemble and provide increases in securing of the pawl 80. When in the tensed relationship, the applied force exerted by the expanded bolt 88 may increase the coefficient of friction between the bolt 88 and the engagement surface 85 enhancing the securing of the pawl 80 against movement. During movement of the pawl 80, such increase in the coefficient of friction is overcome by the force of the actuator 100, which may not be overcome due to vibrations during normal operation of the vehicle e.g. driving. The pawl surface 85 may therefore be caused to slide against the bolt 88 with resistance proportional to the expansion force of the bolt 88 during movement of the pawl 80 from its locked position to its unlocked position. In additional to frictional forces resisting a relative movement of the pawl 80 along the bolt 88, after expansion of the bolt 88 to its flared or expanded assembled state, the flared portion of the bolt 88 may adopt a blocking position against a movement of the pawl 80, for example hook portion 84 of pawl. Hook portion 84 may therefore not only increase the surface contact area of the pawl 80 with the bolt 88 e.g. the outer flared perimeter of the bolt 88, but also the bolt 88 may block the hook portion 84. As a result, during release, hook portion 84 in order to bypass the blocking positioning of the expanded bolt 88 may be caused due to the force of the actuator 100 to slightly deform a portion of the perimeter of the bolt 88. For example the perimeter of the bolt 88 may be deformed by the hook 84 scrapping or indenting or the like the perimeter of the bolt 88, or the hook portion 84 may cause a larger bending or deflection of the bolt 88, or the hook portion 84 itself may be deformed, for example bent to allow the pawl 80 to move from the locked position to the unlocked position, depending on the relative strength of the materials of the pawl 80 and the bolt 88. In an embodiment, the bolt 88 may be pivotally mounted such that during the pawl 80 moving from the locked position to the unlocked position the engagement of the pawl 80 with the bolt 88 may cause the bolt to rotate e.g. counterclockwise as shown in FIG. 8.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An active hinge comprising:
   a hood bracket for attachment to a vehicle hood;
   a body bracket for attachment to a vehicle body;
   a deploy bracket pivotally attached to the hood bracket and the body bracket, the hood bracket being pivotable relative to the deploy bracket between a non-deployed position and a deployed position;
   at least one link interconnecting and pivotally connected to the deploy bracket and the body bracket;
   a pawl pivotally mounted to one of the hood bracket, the body bracket, the deploy bracket, and the at least one link;
   a bolt fixed to one of the hood bracket, the body bracket, the deploy bracket, and the at least one link that the pawl is not mounted to;
   the bolt having a radially expanded portion removably engaged by the pawl in tension for inhibiting movement between the at least one of the hood bracket, the body bracket, the deploy bracket, and the at least one link which the pawl is mounted to, and the at least one of the hood bracket, the body bracket, the deploy bracket, and the at least one link which the bolt is fixed to while the bolt is engaged by the pawl; and
   an actuator for selectively pivoting the pawl for disengaging the pawl from the bolt to allow the at least one of the hood bracket, the body bracket and the at least one link to which the pawl is mounted to move relative to the at least one of the hood bracket, the body bracket and the at least one link to which the bolt is fixed to allow the hood bracket to move from a non-deployed position to a deployed position.

2. The active hinge as set forth in claim 1, wherein the pawl is pivotally connected to the hood bracket, and wherein the bolt is connected to the deploy bracket.

3. The active hinge as set forth in claim 1, wherein the pawl is pivotally connected to the at least one link, and wherein the bolt is connected to the body bracket.

4. The active hinge as set forth in claim 1 wherein the bolt biases the pawl and at least one of the hood bracket, the body bracket, the deploy bracket and the at least one link in opposite directions from one another to bias the hood bracket in the non-deployed position.

5. The active hinge as set forth in claim 1 wherein the bolt tapers between a narrower portion and a wider portion along the radially expanded portion.

6. The active hinge as set forth in claim 1, wherein the radially expanded portion of the bolt has a wider portion having a first diameter, wherein the bolt includes a narrower portion having a second diameter, wherein the first diameter is greater than the second diameter, and wherein the wider portion is for engagement by the pawl.

7. The active hinge as set forth in claim 1 wherein the pawl has a hook portion having an engagement face defining a pocket receiving the bolt.

8. The active hinge as set forth in claim 7 wherein the pawl is rotatable about a pivot point, wherein the engagement face is spaced from the pivot point by a first distance, wherein the pawl further includes a contact face being spaced from the hook portion and aligned with the actuator for being engaged by the actuator to cause the actuator to rotate to disengage the pawl from the bolt, and wherein the pivot point is spaced from the contact face by a second distance.

9. A method for assembling an active hinge, the method comprising:
providing a hood bracket for attachment to a vehicle hood;
providing a body bracket for attachment to a vehicle body;
pivotally connecting a deploy bracket to the hood bracket and pivotally connecting the deploy bracket to the body bracket;
pivotally connecting at least one link to the deploy bracket and pivotally connecting the link to the body bracket;
pivotally connecting a pawl to one of the hood bracket, the body bracket, the deploy bracket, and the at least one link, wherein the pawl defines a pocket;
positioning a bolt against one of the hood bracket, the body bracket, the deploy bracket, and the at least one link, with the bolt received by the pocket of the pawl; and
applying an axial compressive force to the bolt to radially expand the bolt and eliminate radial gaps between the bolt and the pawl to inhibit movement between at least one of the hood bracket, the body bracket, the deploy bracket and the at least one link which the pawl is connected to and the at least one of the hood bracket, the body bracket, the deploy bracket and the at least one link which the bolt is positioned against.

10. The method as set forth in claim 9 wherein applying the axial compressive force to the bolt includes axially pressing the bolt against the one of the hood bracket, the body bracket, the deploy bracket and the at least one link which the bolt is positioned against.

11. The method as set forth in claim 9 wherein the pawl includes a hook portion having a hook shape defining the pocket.

12. The method as set forth in claim 9 wherein one of:
the pawl is pivotally connected to the hood bracket, and wherein the bolt is connected to the deploy bracket; and
the pawl is pivotally connected to the at least one link, and wherein the bolt is connected to the body bracket.

13. The method as set forth in claim 9 wherein the step of applying an axial compressive force to the bolt to radially expand the bolt is during the pawl positioned in a locking position.

14. An active hinge comprising:
a hood bracket for attachment to a vehicle hood;
a body bracket for attachment to a vehicle body;
a locking mechanism coupled between the hood bracket and the body bracket, the locking mechanism comprising an unlocked state for allowing the hood bracket to move away from the body bracket and a locked state for preventing the hood bracket to move away from the body bracket;
the locking mechanism comprising a bolt tapering along a tapering region between a wider portion and a narrower portion, and a moveable lever moveably engaging the tapering region of the bolt in tensed relationship with the bolt to maintain the locking mechanism in the locked state; and
an actuator for selectively moving the lever out of engagement with the tapering region of the bolt for transitioning the locking mechanism from the locked state to the unlocked state, wherein selectively actuating the locking mechanism relieves the tensed relationship to allow the locking mechanism to transition from the locked state to the unlocked state.

15. The active hinge as set forth in claim 14, wherein the moveable lever is a pawl configured for pivotal movement about a pivot axis between the locked position and the unlocked position, the pawl comprising an engagement surface for engagement with the tapering region of the bolt when the pawl is in the locked position to establish the locking state of the locking mechanism, wherein the tensed relationship is established by a portion of the bolt exerting a force against the engagement surface of the pawl biasing the pawl away from the pivot axis of the pawl.

16. The active hinge as set forth in claim 15, wherein the pawl has a hook portion having the engagement surface defining a pocket receiving the bolt, wherein at least a portion of the bolt is in a path blocking a motion of the hook when the pawl is in the locked position.

17. The active hinge as set forth in claim 16, wherein selectively actuating the locking mechanism causes the hook to bypass the portion of the bolt blocking the motion of the hook, wherein the hook bypassing the portion of the bolt blocking the motion of the hook causes a localized deformation of at least one of the bolt and the pawl.

18. The active hinge as set forth in claim 14, wherein the locking mechanism is maintained in the locked state without the use of a spring.

* * * * *